(12) United States Patent
Garman et al.

(10) Patent No.: US 7,427,758 B2
(45) Date of Patent: Sep. 23, 2008

(54) CRYOGENICALLY COOLED ADJUSTABLE APERTURES FOR INFRA-RED CAMERAS

(75) Inventors: John Garman, Los Angeles County, CA (US); Nahum Gat, Los Angeles County, CA (US)

(73) Assignee: Opto-Knowledge Systems, Inc., Torrance, CA (US)

( * ) Notice: Subject to any disclaimer, the term of this patent is extended or adjusted under 35 U.S.C. 154(b) by 407 days.

(21) Appl. No.: 11/273,919

(22) Filed: Nov. 14, 2005

(65) Prior Publication Data

US 2006/0255275 A1    Nov. 16, 2006

Related U.S. Application Data

(63) Continuation-in-part of application No. 10/250,016, filed on May 28, 2003, now Pat. No. 7,157,706.

(51) Int. Cl.
*G01J 5/00* (2006.01)
(52) U.S. Cl. ............................ 250/338.1; 250/347
(58) Field of Classification Search .............. 250/338.1, 250/336.1
See application file for complete search history.

(56) References Cited

U.S. PATENT DOCUMENTS

| | | | | |
|---|---|---|---|---|
| 3,596,096 | A * | 7/1971 | Koehler | ................ 250/339.03 |
| 4,783,593 | A | 11/1988 | Noble | |
| 5,371,369 | A * | 12/1994 | Kent | ........................... 250/352 |
| 6,133,569 | A | 10/2000 | Shoda et al. | |
| 6,249,374 | B1 * | 6/2001 | Chipper | ...................... 359/356 |
| 2003/0086164 | A1 * | 5/2003 | Abe | ........................... 359/407 |

OTHER PUBLICATIONS

W.D.Duncan, E.I. Robson, P.A.R. Ade, M.J. Griffin & G. Sandell, A Millimeter/submillimeter Common User Photometer for the James Clerk Maxwell Telescope, Monthly Notices of the Royal Astronomical Society (1990), 243, pp. 126-132.

B.G. Gom "A Cryogenic Detector for Submillimeter Astonomy," Master of Science Thesis, University of Lethbridge, Mar. 1999, Alberta, Canada, Chapter 3, pp. 25-29.

* cited by examiner

*Primary Examiner*—Christine Sung
(74) *Attorney, Agent, or Firm*—Law Office of Robert E. Kasody, P.C.; Robert E. Kasody

(57) ABSTRACT

A thermal infrared camera may be used under a wide variety of target-scene radiation conditions, with interchangeable or zoom lenses requiring matching or different size cold stops. A variable aperture assembly of a thermal infrared camera integrates a rigid open truss-like framework that's capped by an aperture ring and bottomed by a driving ring, and a radiation shield, located inside the framework, that contains an aperture ring at an upper side. A plurality of blades that collectively define an aperture positioned between the upper aperture rings. Opposite blade ends are coupled to respective ones of the two aperture rings, permitting pivotal movement in one ring and radial movement in the other ring, when the rings are rotated relative to one another, to change the size of the formed aperture. Both refractive and reflective infrared telescopes may be retro-fitted with variable aperture devices to enhance infrared imaging performance.

26 Claims, 8 Drawing Sheets

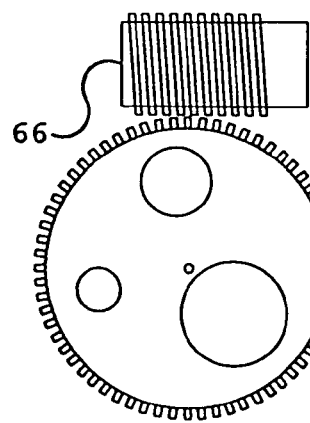
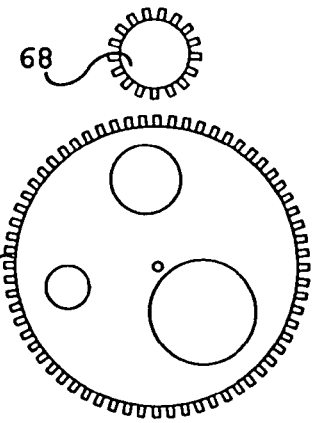
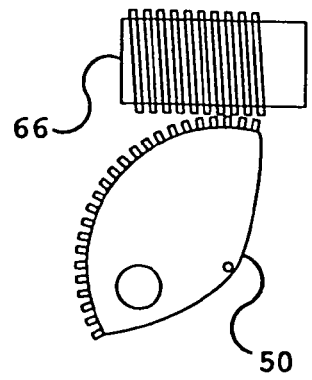
FIG 6A    FIG 6B    FIG 6C
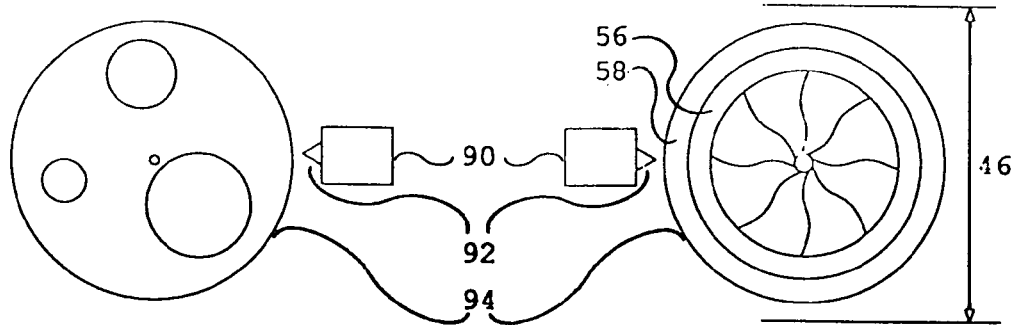
FIG 6D    FIG 6E

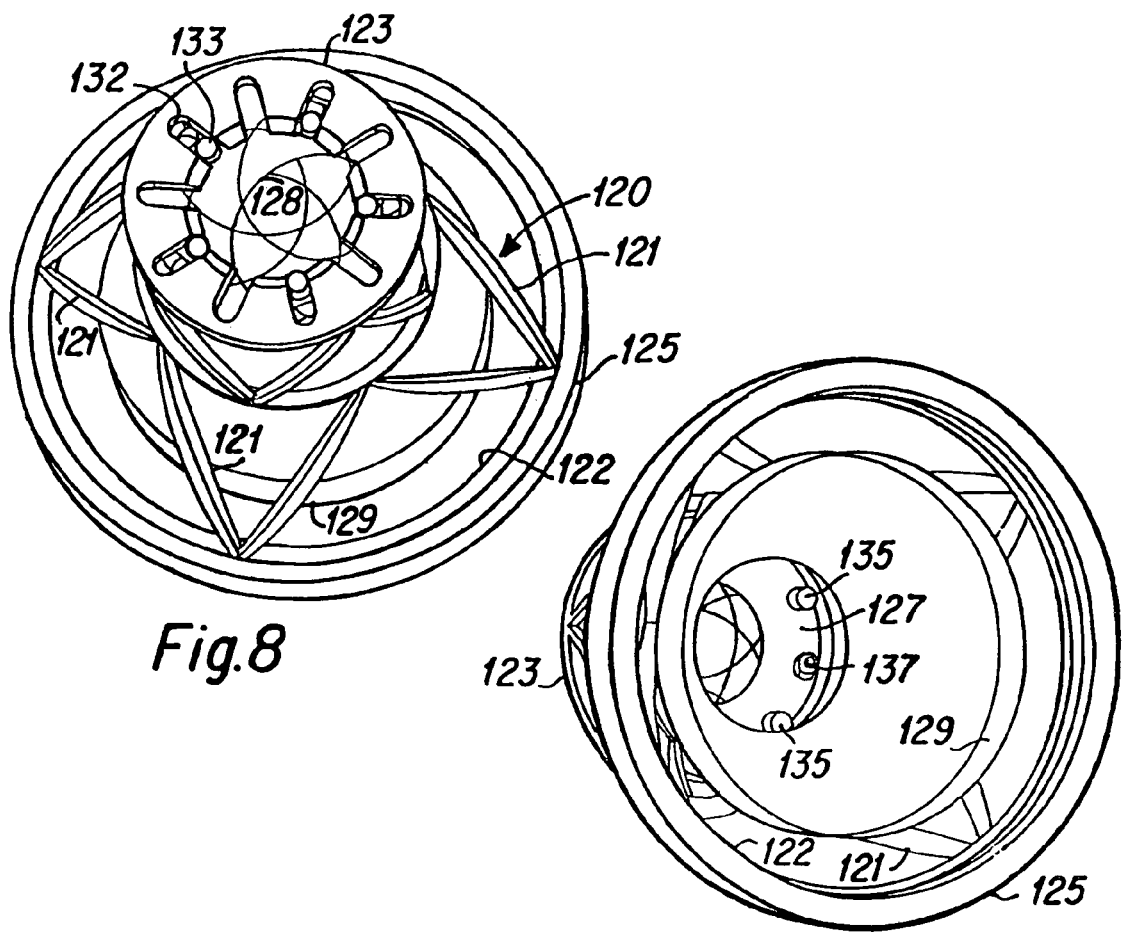
Fig. 8
Fig. 10
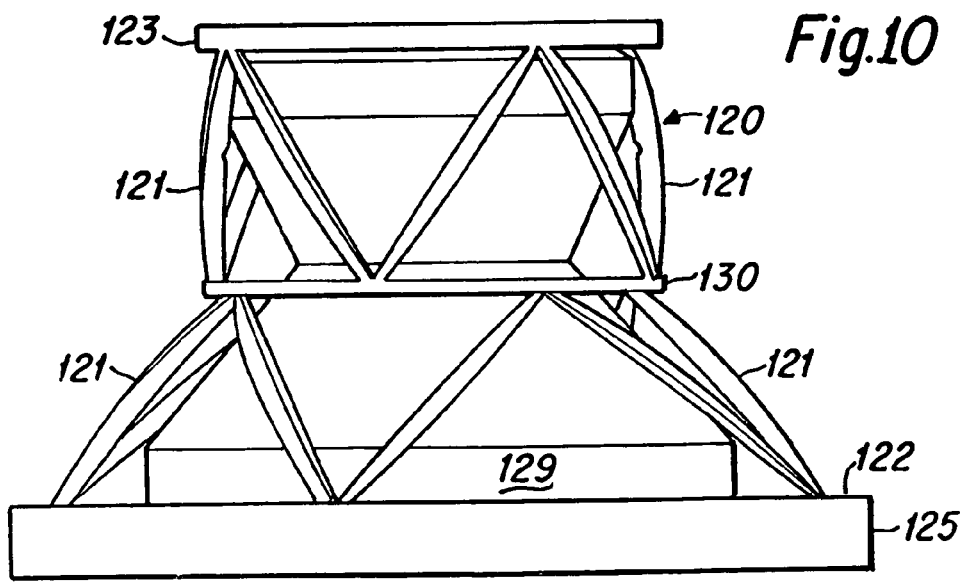
Fig. 9

CRYOGENICALLY COOLED ADJUSTABLE APERTURES FOR INFRA-RED CAMERAS

CROSS-REFERENCE TO RELATED APPLICATIONS

Reference is made to U.S. Application, Ser. No. 10/250,016, filed by the present inventors on May 28, 2003 now U.S. Pat. No. 7,157,706, originally entitled, Method and Apparatus for Using Temperature controlled Variable Diaphragms or Swappable Fixed Apertures with Infrared Cameras, assigned to the assignee of the present application, of which the present application is a continuation-in-part. Applicant claims the benefit of 35 U.S.C. 120 with respect to the foregoing application.

STATEMENT OF GOVERNMENT RIGHTS

This invention was made with U.S. Government support under SBIR Contract Nos. DAAB07-03-C-P004 and DAAB07-02-C-H304 awarded by the U.S. Department of the Defense. The U.S. Government has certain rights in this invention.

BACKGROUND OF THE INVENTION

1. Field of the Invention

The invention relates to infra-red cameras and, more particularly, to the optical or pre-photocell system and variable apertures for such cameras.

2. Background

Thermal infrared radiation is the emission of photons by any and all objects having a temperature that's above absolute zero. Those emissions may be captured by a thermal infrared camera (alternatively, known simply as an infrared camera), which is well known in the art. An infrared sensitive photocell is central to all infrared cameras. A photocell means any device sensitive to infrared radiation, including a single element detector, a linear array and a two dimensional array of detectors (such as a 2D array of IR sensitive pixels) of various infrared sensitive materials. In infrared cameras the photocell is a two-dimensional array of infrared sensitive pixels. In use, the photocell, highly sensitive to thermal infrared radiation (hereinafter frequently referred to simply as "radiation") is exposed to radiation emanating from the object or scene being imaged. However, because the camera enclosure is above absolute zero in temperature, the enclosure concurrently emits radiation that is able to reach the photocell. That additional radiation is not desired, since that radiation negatively affects the operation of the camera. To minimize or eliminate that effect, the photocell is enclosed within a cold structure (referred to as a "radiation shield").

The design of the radiation shield is dictated simply: if an observer were to look out from the photocell, anything the observer could see would emit radiation that would be incident on the camera photocell. In order to block the undesired radiation, the radiation shield must be the only internal camera structure that the photocell is able to "see." The radiation shield shouldn't emit an excess of radiation. The "cold stop," which is simply a name for a cooled aperture, provides the only path through the focusing optics for external radiation to reach the photocell. The cold stop size is a compromise between the effectiveness of blocking the unwanted radiation (requiring a small aperture) and excessive vignetting (requiring a large aperture). An ideal cold stop position exists at the exit pupil of the lens. At that location the size of the cold stop is equal to the size of the exit pupil of the front optics, producing 100% effectiveness and no vignetting.

An active cooler, typically, such as a Peltier cooler, is often integrated into the camera to keep the photocell and other components of the infrared camera cool. Typically, in order to control the unwanted radiation seen on the photocell, the cooling system must maintain a low fixed temperature. Ideally, the temperature of the radiation shield is cold enough to produce only a negligible amount of radiation at the photocell. That fixed temperature has a known effect on the photocell and that effect can be removed through image post processing. The photocell is also cooled to improve its radiation sensitivity and reduce the internally generated current, as the higher the temperature of the photocell, the lower its usable dynamic range. However, in more sensitive systems the system must be cooled to as low a temperature as reasonably possible to minimize any unwanted radiation loading. In such systems, several options are available for achieving the necessary cooling, including integrating the cameras into dewars for liquid nitrogen or liquid helium, Stirling cryogenerators, Gifford-McMahon mechanical coolers, and other such devices.

To reduce thermal load on the cooling system, infrared camera designers often place all of the cooled elements inside a vacuum vessel. Within the vacuum vessel, the radiation shield and the photocell are maintained at a low, sometimes cryogenic, temperature, based on the photocell requirements and the desired performance. The vacuum vessel, (if present) often constitutes a camera housing, which also often contains, or provides, a mounting apparatus for the infrared focusing lens. The term "lens" as used herein should be understood to be inclusive of all light collecting devices including refractive or reflective systems.

Thermal infrared cameras must be able to accommodate both hot and cold target objects and scenes, while distinguishing the target from background radiation. Although the thermal control methods described above can allow a camera to be used in a wide variety of thermal scenes, drastic changes in radiation quantities require different camera settings. If the scene is too cool for ideal use with the camera, the camera operator can take a longer exposure of the scene. Doing so may adversely affect the frame rate and may lead to resolution problems if the camera or target is moving. Another solution typically used in the art is to change the electronic gain of the signal from the photocell, even though increasing the gain also increases the noise in the electronic signal. Conversely, in hot scenes, reduced exposure time, reduced signal gain, or a combination of the two can allow an infrared camera to capture the scene. When a very bright event occurs (e.g., an explosion, a launch of a missile) in a scene with a very high dynamic range the photocell could saturate. A method to avoid saturation of the photocell is by reducing the size of the optical aperture. In conventional video camera, the iris mechanism is often coupled to the photocell readout electronics, controlling the iris in response to the radiation intensity.

Apertures and Cold Stops. A cold stop is simply a temperature-controlled aperture. In its most basic form, the cold stop is a fixed aperture, similar to the apertures found in some disposable visible light cameras. Variable diaphragms (hereinafter used interchangeably with the term "iris") for light cameras, including continuously variable and swappable fixed apertures, have been described in patent art for many years (see e.g., U.S. Pat. No. 24,356 to Miller and Wirsching in 1859, U.S. Pat. No. 582,219 to Mosher in 1897). The variable diaphragm works by allowing more (or less) of the radiation (visible light, in the case of visible light cameras) that reaches the focusing lenses to pass through to the photocell or film. The focusing lens receives radiation and focuses it based on the distance from the radiation source to the lens and the prescription of the lens. The prescription includes the focal length and the f-number. In conventional visible light cameras (and unlike infrared cameras), the aperture is typically built into the compound lens assembly. That aperture then lets pass a certain desired portion of the radiation intercepted by the lens.

With a very large aperture, nearly all of the light arriving at the focusing lens passes through the aperture. By reducing the size of the aperture, the mechanism of the aperture blocks a portion of the light from entering. In typical visible light cameras, the aperture is located at the point where the cone of light from the object is wide, at the pupil or aperture stop; and thus diminishes the light intensity without affecting the image quality. Lenses may have specific aperture requirements, which determine the optimum position and size of the aperture. This is typically a function of the f-number (hereinafter interchangeably also referred to as "f-number"), the focal length of the lens, and the construction.

However, in infrared cameras, the aperture cannot be located in the lens, since the lens is not cooled and the aperture must be cooled so the aperture doesn't radiate onto the infrared photocell. A lens for use with infrared cameras ideally has its exit pupil located far enough behind the lens mount to the camera body, and at the end of the radiation shield, where the cold stop is mounted. The fixed aperture is typically located in the converging path of the light at the end of the radiation shield; that is, between the lens and the focal plane. The aperture thus defines an effective f-number for the system. If the lens f-number matches the fixed aperture f-number the camera is said to be aperture matched. If the lens f-number is smaller, i.e., faster than that of the fixed aperture then some of the incoming radiation is clipped by the aperture, and if the f-number of the lens is larger, i.e., slower, than that of the fixed aperture, the photocell can "see" the mechanical structure of the camera and it receives undesired radiation from the camera structure.

Interchangeable lenses will have different f-number's. Unless the aperture is changed, the f-number of the camera won't match the f-number of most of those lenses. A need thus exists for an adjustable aperture that can match the f-number of interchangeable lenses. That aperture must be placed at the lens' exit pupil location, that is, inside the vacuum enclosure and at the end of the radiation shield, and should be adjustable to match the lens' f-number or the exit pupil size.

As a result, when interchangeable lenses of a different f-number are used with an infrared camera, the system f-number may not match the f-number of the lens. No solution heretofore existed in the prior art to this problem prior to this invention. A variable diaphragm or aperture, however, is able to correct the foregoing situation and match the system f-number to the specific lens in use.

U.S. Pat. No. 6,133,569 (the "'569 patent") to Shoda and Ishizuya discloses a thermal infrared camera that appears to incorporate the above-mentioned features. The '569 patent further notes the promising idea of using variable diaphragms in thermal feedback infrared cameras, that is, in cameras with thermal sensors controlling cooling elements. Specifically, Shoda and Ishizuya suggest the use of an optically variable diaphragm optionally thermally coupled to the infrared radiation shield, but without providing the reader with any tangible details beyond the basic thought. However, due to the limitations discussed hereafter in regard to cooling the variable diaphragm, the '569 patent does not make possible the use of such a variable diaphragm in an infrared camera.

The use of continuously variable diaphragms or swappable fixed apertures that are used to match interchangeable lenses with different f-number numbers in thermal infrared cameras hasn't been viable because of fundamental packaging and thermal control problems. As earlier described, the aperture must be cooled. While an effectively cooled variable diaphragm is difficult to design, the problem becomes considerably more difficult if the aperture must be kept at cryogenic temperatures and be located inside a vacuum chamber. Within a vacuum chamber, the aperture and the associated drive mechanisms cannot outgas. Depending on the depth of vacuum, this may require a completely dry iris and specially designed lubricants, electrical wiring, motors, and gears. Moreover, the drive mechanism cannot add heat load onto the cooling system, nor allow conductive heat load from the ambient vacuum enclosure to affect the cooling system. Equally important, the aperture must dissipate energy from the radiation that it blocks. These and other considerations for the aperture itself have made implementing a variable diaphragm impossible given the prior art.

Further, with continuously variable diaphragms or interchangeable fixed apertures, there must be some mechanism for changing the size of the aperture. Mechanical, electromagnetic, piezoelectric, or other such control means must be available to change the diaphragm size or interchange the fixed apertures. The control means must be strong enough to operate the variable diaphragm or interchangeable fixed aperture in a timely manner, and either be thermally isolated from the photocell or operate at cryogenic temperatures. If the aperture is in a vacuum, the control means must be small enough to fit within the vacuum chamber or provide some means for transferring mechanical force through the wall of the vacuum chamber. Where such transfer of mechanical force occurs, complex seals must be used to ensure the integrity of the vacuum is un-compromised and that excessive heat is not conducted into the radiation shield.

Aperture control means located in a vacuum chamber require constraints that make their implementation significantly less feasible. First, the materials used in conjunction with the control means cannot outgas, as vaporized materials not only destroy the vacuum that provides the thermal isolation for the cold components, but also condense on the photocell. For that reason, bearings, linings, coatings, winding insulation, and any cements or glues must be eliminated or replaced with a fluorinated polymer or polytetrafluoroethylene based insulation, such as Teflon® brand insulation, or otherwise be coated or manufactured with special non-outgassing materials.

Moreover, the motor control means must also be able to cool itself effectively without the typical convection of heat into air. This means that all heat generated in the motor must be dissipated through conduction to the motor mounting apparatus. The control means must therefore be thermally isolated from the aperture it controls. The motor must incorporate heat-reducing technology, including bipolar drives, low current standby systems, and other such options. Furthermore, the diaphragm control means must not produce electromagnetic interference (EMI) that can distort the electronic signal produced by the photocell. Mechanical or other temperature control means must often also be associated with the motor.

Finally, for control means located in a vacuum, there is an additional potential problem created by high voltage to exposed conductors in the motor apparatus. In extremely low-pressure vacuums, the remaining air molecules subject to high voltage can ionize and current will flow as if the vacuum chamber were an electron tube, creating strong corona effects. These effects are particularly problematic near highly sensitive photocells, so careful insulation is needed on any exposed electric contacts.

An additional packaging problem exists where a variable diaphragm system must fit within the same confines as an existing fixed aperture camera. In these retrofit cases, the entire aperture control means must fit within very small confines that were not designed to accommodate such hardware.

Accordingly, a need exists in the art for a variable diaphragm that overcomes or avoids the above problems and limitations, which constitutes a principal object of the invention.

A further object of the invention is to allow the use of interchangeable optics, including interchangeable compound lenses, in a single infrared camera, by providing a means to match the aperture number (ie. f-stop) of the camera to the aperture number of the lenses.

A still further object of the invention is to retrofit an infrared camera that contains a fixed cold stop aperture for use with a lens that is of a different f-stop number from that of the camera.

Our prior application for U.S. patent, Ser. No. 10/250,016, filed May 28, 2003, presently pending, the content of which is incorporated herein, addresses most of the same goals, and describes an invention in a thermal infrared camera that includes a variable aperture. Among other things, the present application describes a variable aperture assembly of improved structure not previously described.

SUMMARY OF THE INVENTION

In accordance with the invention, a variable aperture assembly of a thermal infrared camera integrates a truss, a rigid open framework, called the actuator, that's capped by an aperture ring and bottomed by a driving ring, and a radiation shield that contains an aperture ring at the upper end. The radiation shield is located inside the framework positioned with the two aperture rings juxtaposed. A plurality of small blades positioned between the upper aperture rings collectively defines an iris or aperture. Opposite ends of the blades are respectively coupled to respective ones of the two aperture rings. One coupling allows pivotal blade end movement in one aperture ring and the other coupling allows radial blade end movement in the other aperture ring, when one aperture ring is rotated relative to the other, changing the size of the formed central iris or aperture much like the occurs with an ordinary camera diaphragm.

With the radiation shield held stationary, rotating the driving ring rotates the aperture ring that's connected to the framework relative to the companion aperture ring on the radiation shield, thereby pivoting the overlapping blades outwardly or inwardly about one blade, depending on the direction of rotation and varying the size of the defined aperture. The f-number of the infrared camera can thereby be adjusted to match the f-number of the object lens. The framework material is a poor heat conductor and, due to the skeletal nature of framework members, the heat transfer path between the driving ring and the aperture ring of the framework is of low thermal conductance so as to substantially thermally isolate one end of the actuator from the other.

For a camera built with a hermetically sealed dewar or vacuum enclosure with a fixed aperture that is to be used with a reflective telescope that is not f-number matched to the camera, the present invention teaches how to add an external variable aperture mounted in front of the camera between the camera body and the telescope. The external variable aperture is placed in a vacuum enclosure and is cooled in a similar fashion to the variable aperture described herein that is located inside the camera vacuum enclosure. The external variable aperture is coupled with a relay optical assembly that images the variable aperture onto the camera's fixed aperture, thereby matching the f-number of the telescope to that of the camera.

Accordingly, with the invention a single thermal infrared camera may be used under a wide variety of target-scene radiation conditions that may be rapidly changing, with interchangeable or zoom camera lenses requiring matching or different size cold stops (f-numbers), and under other such dynamic situations. The aperture rings, blades and radiation shield can be cooled to cryogenic temperatures while heat from the driving ring cannot readily propagate to the aperture ring.

A single thermal infrared camera under a wide variety of target-scene radiation conditions that may be rapidly changing, with interchangeable camera optics requiring different size cold stops, and under other such dynamic situations. The invention makes possible the upgrading and retrofitting of fixed aperture infrared cameras with variable diaphragm hardware. The f-number of the camera may now be adjusted to optimize imaging and the adjustment bridges the boundary between the very cold elements and those that are much higher in temperature without permitting significant heat transfer that would adversely affect imaging.

The scope of application of the inventive method and apparatus is believed to be broad, as a number of alternative thermal isolation and diaphragm control means may suggest themselves to those skilled in the art as suitable for a wide variety of thermal infrared camera applications. These applications include military thermal signature identification (including aircraft, vehicle, missile identification), military and other field of view changes (switching camera use from wide area search to narrow field of view as a target is acquired and tracked, used in target tracking and fire control systems), police surveillance (detecting the presence of people, objects, etc.), general security and surveillance applications (detecting and identifying intrusions), search and rescue (finding people or vehicles), firefighting (finding victims in smoke-filled rooms), and general zooming in or out with infrared cameras, to name a few.

BRIEF DESCRIPTION OF THE DRAWINGS

In the drawings:

FIGS. 6a, 6b, 6c, 6d, 6e, 6f, and 6g show views of several embodiments of the inventive aperture drive mechanisms, highlighting implementations of the aperture with an exemplary worm gear driven swappable fixed aperture drive in FIG. 6a, a gear cog driven swappable fixed aperture in FIG. 6b, a simple two-aperture worm gear driven swappable fixed aperture drive in FIG. 6c, an exemplary piezoelectric driven swappable fixed aperture in FIG. 6d, an exemplary piezoelectric driven variable diaphragm in FIG. 6e, and two exemplary embodiments of electromagnetic aperture control means in FIGS. 6f and 6g;

FIGS. 8, 9, and 10 illustrate a practical embodiment of a variable aperture device for an infrared camera in top perspective view, side view and bottom view, respectively;

DETAILED DESCRIPTION OF THE INVENTION

Figure 1:
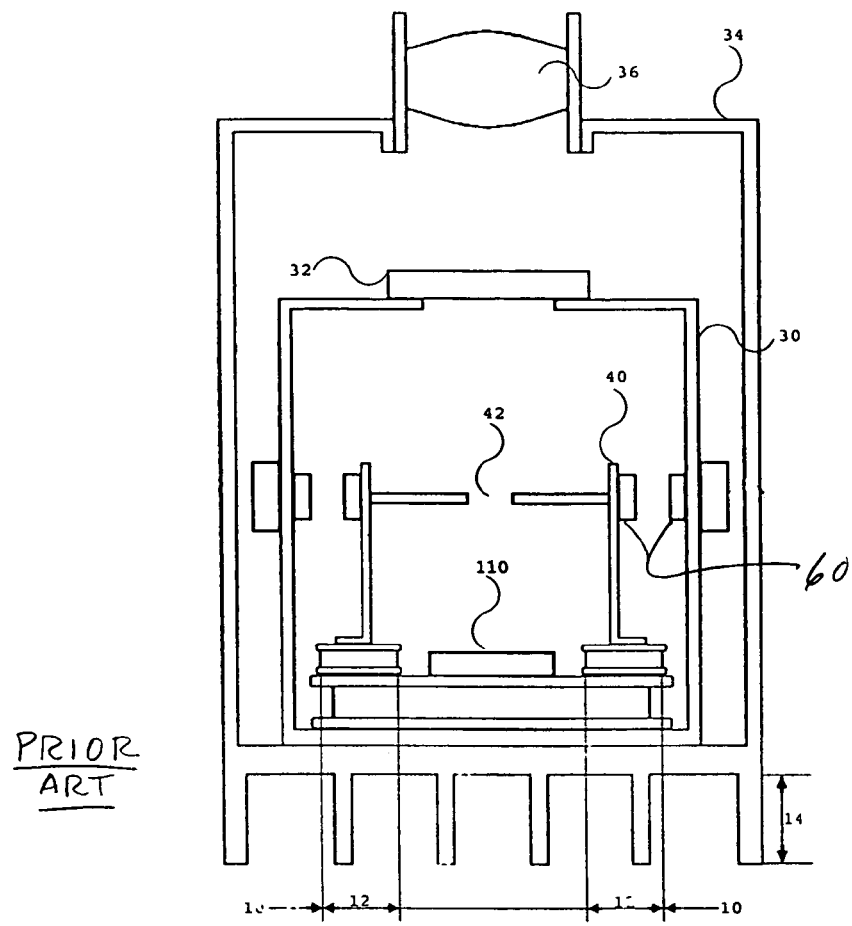
FIG. 1, labeled "prior art" shows a schematic section view of a Peltier-cooled thermal infrared camera found in U.S. Pat. No. 6,133,569, which is helpful in describing the present invention.

The present invention is of sufficient complexity that the many parts, interrelationships, process steps, and sub-combinations thereof simply cannot be fully illustrated in a single patent-type drawing or table. For clarity and conciseness, several of the drawing figures show particular elements in schematic form and omit other parts or steps that are not essential in that drawing to the description of a particular feature, aspect, or principle of the invention being disclosed. Despite such omissions, as those skilled in the art should recognize, the following description nonetheless enables one skilled in the art to make and use the invention without undue experimentation, and several embodiments, adaptations, variations, alternatives, and uses of the invention are described, including those presently believed to be the best modes of carrying out the invention. It should be appreciated that the details presented in this specification are presented as examples of the invention, and are not intended to be limiting the scope thereof.

The prior art infrared camera is typified by the U.S. Pat. No. 6,133,569 (the "569 patent") Peltier cooled thermal infrared camera, an embodiment of which is shown in FIG. 1 to which reference is made. The infrared camera of FIG. 1 comprises all the basic parts of an infrared camera of the type that contains a vacuum chamber. From the outside, the camera housing 34 supports a focusing lens 36 as the first part of the image optics system and cooling fins 14 to disperse the heat extracted by the cooling Peltier elements 10 and 12. A vacuum chamber 30 is contained within housing 34. That chamber contains a radiation transmissive window 32 to allow infrared radiation to pass to the inner part of the infrared camera. The vacuum chamber 30 also includes a variable aperture diaphragm mechanism 60 contemplated by the invention, illustrated in block form, that was heretofore impossible to implement in an infrared camera, is included. That mechanism corresponds to proposed elements 70 and 71 suggested in the '569 patent, but not possible to implement without more information. Cooling Peltier elements 10 and 12 are located within vacuum chamber 30 and the separate cooling elements for the infrared sensitive photocell 110, namely cooler 10, and for the radiation shield 40, namely, cooler 12. The radiation shield 40 comprises an aperture 42 that allows infrared radiation to pass to infrared radiation sensitive photocell 110.

Figure 2:
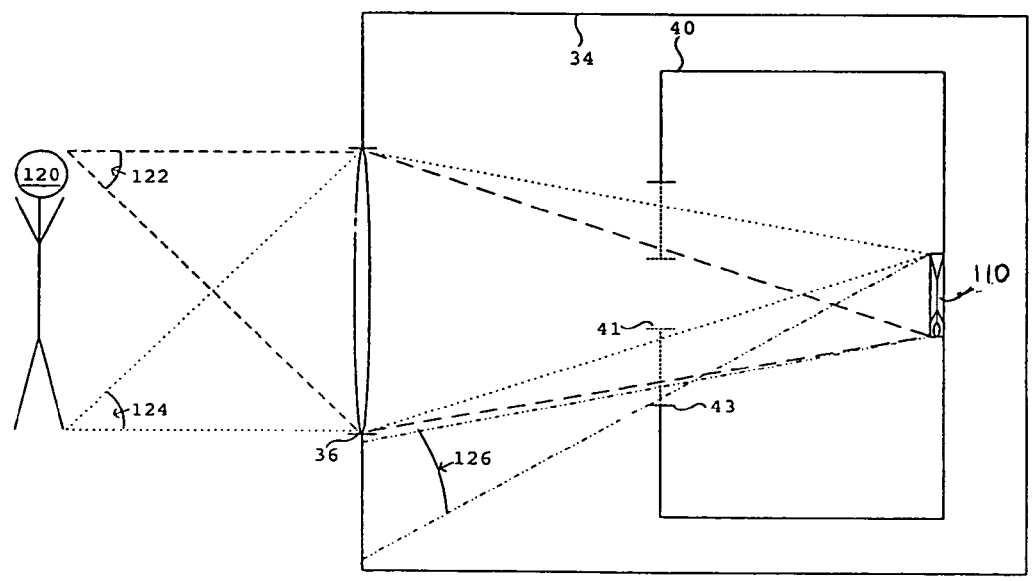
FIG. 2 illustrates the path taken by light from an external object into and within an infrared camera, namely through a focusing lens and an aperture to the infrared sensitive photocell, and illustrates the effect of various sized apertures on images and unwanted thermal loads as helpful background to the invention.

Referring to FIG. 2A, a schematic view of radiation collected by a focusing lens 36 is shown that then focuses that radiation at the photocell 110, through an aperture, illustrating how the aperture 41 is able to block too much (or too little) radiation, and demonstrating the balance between vignetting and cold stop effectiveness. Two sizes of a possible aperture are shown: a large aperture 43, and a smaller one, 41. The radiation originates at the source 120, whether the radiation is light reflecting off an object, heat emanating from the object, or a combination of the two, is unimportant. Radiation from each point of the source travels in many directions. Radiation (formed in cones 122 and 124, drawn with dashed and dotted lines, respectively) arrives anywhere on the focusing lens 36. That radiation 122 and 124 is focused onto the photocell 110, arriving at a location on the photocell relative to the originating source location to create an image of the original source 120 on the photocell 110.

In this case, radiation cone 122 emanating from the circular shaped upper end of source 120 arrives at the bottom end of the photocell 110, where an image of that upper end is formed. The same focusing applies to radiation (cone 124, drawn with dotted lines) emanating from a point at the bottom of the source. This radiation 124 focuses to the optics side of the photocell 110. In this way, the entire source 120 is imaged upside down onto the photocell 110. The invention, however, is not limited to applications with optics that invert the image. If a small aperture 41 is used, the aperture blocks a portion of the radiation being focused toward the photocell and that portion of radiation cannot pass.

The aperture size is also dictated by the need to reduce or eliminate radiation emanating from non-cooled portions of the camera, because such undesirable radiation would otherwise arrive at the photocell and cause interference. This aspect of aperture size is shown in FIG. 2A, where radiation cone 126 emanates from the camera housing to the right of focusing lens 36 in the figure. The two lines defining cone of radiation 126 encompasses the relevant extremes of undesirable radiation. That cone of radiation is blocked by the small aperture 41, but is allowed to reach the photocell by the large aperture 43. By reducing the size of the large aperture 43 slightly, additional extraneous radiation 126 can be blocked, without affecting the source radiation cone 122. By reducing the size of the aperture 43 and impinging on the source radiation cone 122, more of the radiation cone 126 from the non-cooled housing can be blocked. In this manner, between the too small 41 and too large 43 apertures there's an appropriately sized aperture that offers the best compromise between vignetting and cold stop efficiency.

Figure 2B:
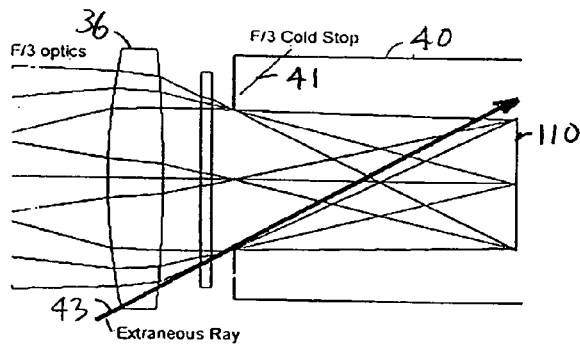
FIGS. 2B and 2C respectively illustrate the path taken by light rays and an extraneous light ray through a camera in which the f-number of the cold stop of the camera is the same as the f-number of the object lens for the camera, and through a camera in which the f-number of the cold stop of the camera is less than the f-number of the object lens for the camera.
Figure 2C:
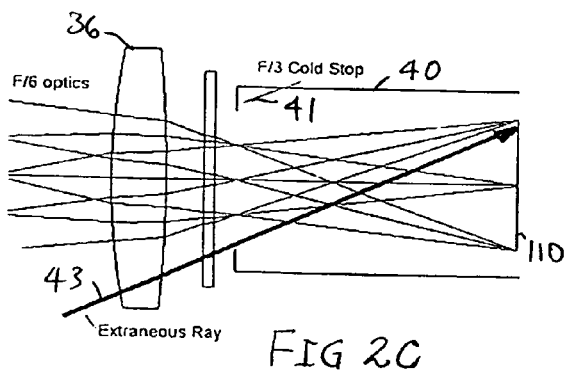

The difference between a matched lens and infrared camera and one not so matched is further illustrated in FIGS. 2B and 2C, respectively. As illustrated in FIG. 2B, when the f-number of the lens 36, say f-3, is matched to the f-number of the cold stop 41, also f-3, of the infrared camera as example, the rays of infrared light coming from the distant object being imaged proceed through the cold stop to the infrared sensor 110 of the camera. However, a stray or extraneous ray 43 proceeds through the cold stop, but is not incident on infrared sensor 110. Hence, the extraneous ray does not adversely affect the received image at the sensor. However, referring to FIG. 2C, when the f-number of the lens 36, say f-6, does not match the f-number of the camera, illustrated as f-3, the extraneous ray of light 43 proceeds through the cold stop of the camera and is incident of the infrared sensor 110. That adversely affects the image of the distant object at the sensor.

Referring again to FIG. 2A, further complicating aperture design, specific coatings are required for the photocell-side of the aperture as well as the inside surface of the radiation shield 40, since radiation from cone 126 reflecting off the radiation shield 40 should be damped or absorbed as efficiently as possible to reduce stray light load at photocell 110. If the photocell-side of the aperture reflects radiation, stray radiation in the radiation shield 40 may be deflected back onto the photocell 110.

The problem with aperture sizing shown in FIG. 2A remains, however, for cameras that change the f-number of the optics. The proper size aperture for a camera depends on the f-number of the optics. Once that f-number changes, the aperture may no longer be optimal for the camera. For example, in applications where a wide angle search mode is used to acquire a target, an aperture may be optimal for a wide field of view. Once a target is acquired, however, the optics may be switched to a narrow field of view, using a zoom or telephoto lens as example. The f-number thereby changes, changing the required cold stop size, and leaving the fixed aperture mismatched to the new optics. Reaction to the foregoing change is next addressed in the description of the best mode of implementing the invention.

Figure 3:
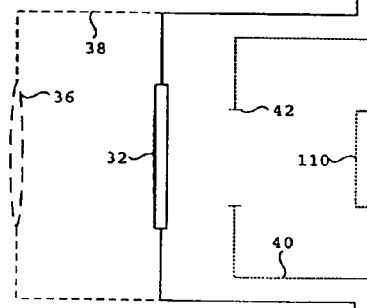
FIG. 3 shows a schematic view of a liquid nitrogen dewar based infrared camera, showing a typical dewar in section.

Continuing the description of the prior art, internally, the various types of prior art thermal infrared cameras are similar. FIG. 3 shows a schematic planar slice or section of a typical liquid nitrogen dewar-based infrared camera. In this figure, the cooling element is a liquid nitrogen dewar 20 (hereinafter also referred to as an "LN2 dewar"), pictorially illustrated. This is a chamber containing liquid nitrogen to which various parts of the infrared camera may be mounted, especially those requiring cryogenic cooling. Typical, though not required, of LN2 dewars, the camera housing 34 is integrated with vacuum chamber 28. The vacuum chamber 28 extends around the LN2 dewar 20 and the radiation shield 40, so that everything within the exterior housing 34 is within the vacuum chamber and under a vacuum 28. The LN2 dewar is filled with liquid nitrogen and the photocell 110 is mounted directly to the LN2 dewar 20. In this manner, the photocell 110 is maintained at cryogenic temperatures. The radiation shield 40 is also mounted to the LN2 dewar 20, to keep the radiation shield 40 at a similar temperature. Attached to the outside of the camera housing 34 is the external optics housing 38, containing the focusing optics 36. The vacuum in the vacuum chamber is maintained by the transmissive window 32.

Figure 4A:
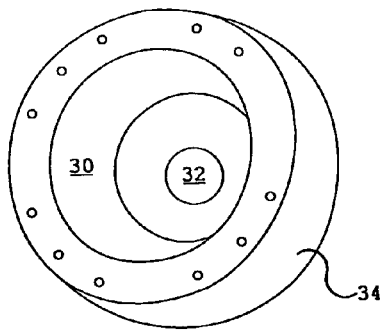
FIGS. 4a and 4b, respectively, show a pictorial and schematic view of the principal components of a liquid nitrogen dewar based infrared camera of the type in FIG. 3 that are located around the photocell and their relative assembled positions.
Figure 4A:
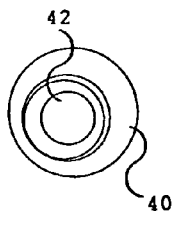

Reference is next made to FIG. 4a, which shows a pictorial view of an exemplary housing and radiation shield of a liquid nitrogen dewar based infrared camera of the type described in FIG. 3. The portion of the camera housing 34 that covers the optics section (as opposed to the LN2 dewar section) in FIG. 4a, is shown from the side that normally faces the camera interior. At the center of the housing 34 is the transmissive window 32. The inside wall of the camera housing 34 makes up the wall of the vacuum chamber 30. The radiation shield 40 is shown from an above angle. The fixed aperture 42 of the prior art is located at the optical entrance and center of the radiation shield 40.

Figure 4B:
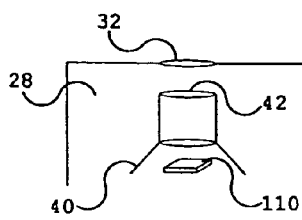

FIG. 4b is a side view planar slice of the assembled components of a camera, showing relative locations of the components. The photocell 110 is shown below the radiation shield 40. The radiation shield 40 mounts on the same plane as the photocell 110, both mounting onto the LN2 dewar (not shown). The optical entrance of the radiation shield 40 is the fixed aperture 42. The camera housing 34, including the radiation transmissive window 32, is located exterior to radiation shield 40. The area around the exterior of radiation shield 40 is under a vacuum 28.

Figure 5A:
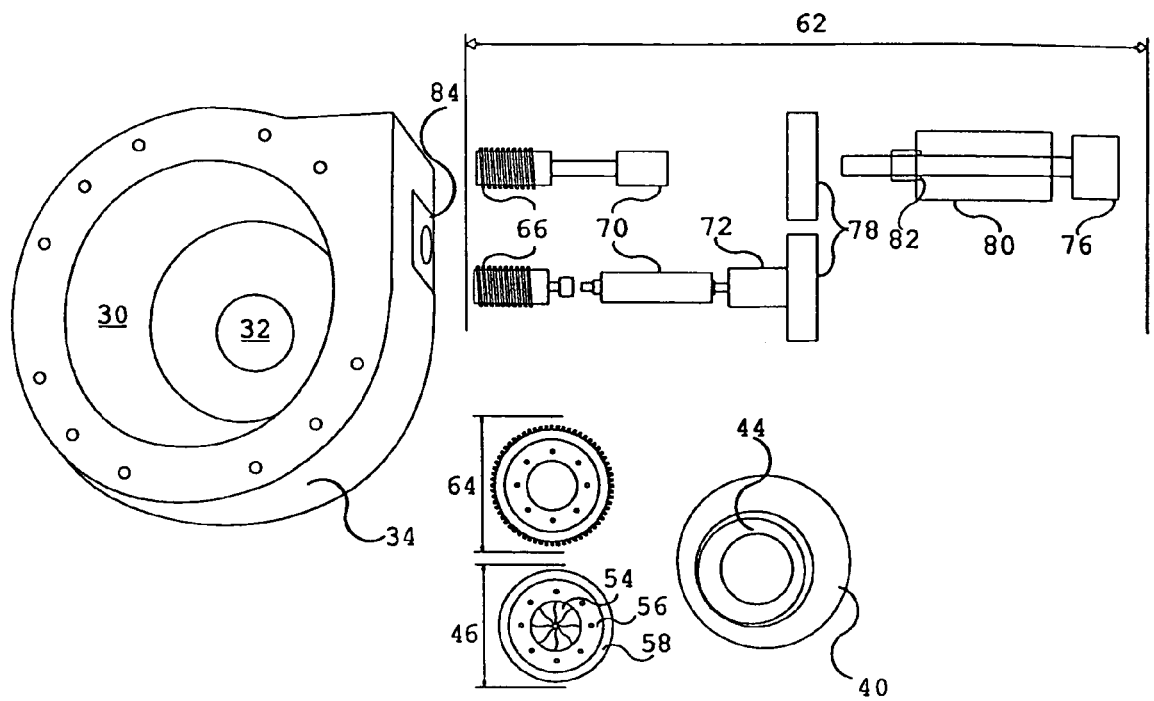
FIGS. 5a and 5b present, respectively, a pictorial layout and a schematic view of an embodiment of a variable aperture apparatus in accordance with the invention, corresponding to the views of FIGS. 4a and 4b, respectively, highlighting the additions in implementing a variable diaphragm, the components necessary for a gear driven embodiment and the approximate order of assembly.

In order to implement a variable diaphragm, several new mechanisms are necessary. FIG. 5a shows a schematic layout view of an embodiment of the apparatus, arranged as in FIG. 4a, but demonstrating some of the major differences involved in implementing a variable diaphragm or interchangeable aperture. As those skilled in the art appreciate, the foregoing reference to variable diaphragm implies one that is continuously variable. In the generic sense, however, the term encompasses both diaphragms with an aperture that may be changed in size continuously or an aperture that may be changed in large steps (e.g., swappable or interchangeable apertures as variously termed). For convenience the term is used herein in the generic sense, thereby encompassing interchangeable apertures. In order to accommodate mechanical aperture control means in a camera, the vacuum chamber 30 and housing 34 must be modified to add either a motor control means mounting location 84 or means for transferring mechanical force through the wall of the vacuum chamber (e.g., a vacuum feed-through), also at location 84. Two exemplary worm gear systems 62 comprised of several shown parts are directly exterior to location 84.

Both worm gear examples use a worm gear screw 66 attached through a coupler 70 to the control means. In the case of the top system, the vacuum chamber seal 78 is penetrated by a rotary dial adjuster 76 and a vacuum feed-through 80. In this example, the dial adjuster 76 contacts warm air outside of the housing 34. Since the coupler 70 and the rest of the worm gear system are within the vacuum chamber 30, the dial adjuster 76 and coupler 70 must be made of minimally heat-conductive materials or thermal insulator material. Moreover, in either the manual or motorized worm gear examples, the coupler 70 for the dial adjuster 76 must minimize the heat transference to the variable diaphragm 46. In addition, there must be a high performance vacuum seal for the vacuum feed-through 80, capable of maintaining high vacuum. One of the several seals necessary is shown 82. This system allows the infrared camera operator to adjust the aperture size manually and directly.

The second worm gear system 62 shown utilizes a motor drive 72 rather than a rotary dial adjuster 76. The motor drive 72 is attached to the vacuum chamber seal 78 and the coupler 70. Through the coupler 70, the motor drive 72 turns the worm gear screw 66. In this arrangement, the motor drive 72 must be vacuum-capable, which means that the motor drive must not outgas, must use special coatings, must be capable of shedding heat through the vacuum chamber 30 and camera housing 34, and must not contain exposed electrodes that may cause a corona effect.

A further complication may arise when using a stepper motor 72 of the appropriate size. Such a motor 72 is not likely to possess sufficient torque to operate variable diaphragm 46. Should that be the case, the system contemplates the use of a reduction gearbox. Such a gearbox would be located between the motor 72 and the worm gear screw 66, where the coupler 70 is shown in the figure.

In infrared cameras that do not integrate the camera housing 34 and vacuum chamber 30, it can be easier to maintain a cryogenic temperature at the important parts of the camera. In such a case, the motor 72 could be mounted external to the vacuum chamber 30, to reduce heat transference to the cryogenic parts. Mounted externally, the motor 72 would not need to be vacuum-safe, and could be a normal motor, simply associated with a vacuum feed-though of the type shown at 80. Such an embodiment simply drives the vacuum feed-through 80 and rotary dial adjuster 76 using an externally mounted motor.

In either arrangement, the worm gear screw 66 then contacts the driven gear 64 of the variable aperture assembly. This connection should be as thermally isolative as possible, using less thermally conductive materials or insulators for the parts of the mechanisms. The driven gear 64 is attached to the variable diaphragm 46 and the assembly is mounted to the optical entrance of the radiation shield 40 at aperture mounting location 44 (which is the location intended for a fixed aperture in a non-variable aperture design).

The typical variable diaphragm 46 consists of at least three basic parts. There are iris fingers or blades 54 and two rings 56 and 58 that form the major components of a variable aperture mechanism. The iris blades 54 form smaller or larger apertures on the central axis as they are manipulated. Generally, in some designs the iris fingers or blades 54 are flat and either curved or triangular and have two pivot points. The two pivot points are attached to an inner ring 56 and an outer ring 58. In the closed position, where the variable diaphragm size is at its smallest (nearly completely closed), the pivot points form a line which approaches the center of the aperture. As the two rings 56, 58 rotate relative to each other in opposite direction, the pivot points move apart, causing the iris blades to pivot away from the center of the aperture, making the aperture size greater.

Variable diaphragm mechanisms of the foregoing construction are known in the art and are available commercially. However, this mechanism allows the driven gear 64 to be attached in such a way that the whole worm gear system 62 can open and close the aperture. Although the best mode of implementation will vary by the application, one possible arrangement is for the driven gear 64 to be attached to the inner ring 56 of the variable aperture device (thus, here, the inner ring 56 has features identical to the driven gear 64, allowing the two to be attached physically). The outer ring 58 is then attached to the radiation shield 40 at the aperture mounting location 44. As the worm gear screw 66 turns the driven gear 64, the inner ring 56 is turned relative to the outer ring 58, which is fixed. The variable diaphragm 46 is thus controlled by the worm gear system 62.

The variable diaphragm 46 itself must meet certain requirements. Any portion of the variable diaphragm 46 facing the photocell 110 should be coated in a radiation absorbing material or color. Typically, the photocell-side of the radiation shield 40 is coated in black, though the reflectivity in the infrared is more important than the visible-spectrum "color." The iris blades 54 must be allowed to move along one another freely, without relying on greases or other outgassing lubricant materials. For this reason, the blades should be coated with a material functionally similar to Teflon® brand polytetrafluoroethylenes. The result is that the iris blades 54 must be low friction and low reflectivity coated. As a last caveat, the reflective and black coatings of the iris blades 54 must be specifically designed not to shed reflective material onto the photocell-side of the overlapping iris blades.

Figure 5B:
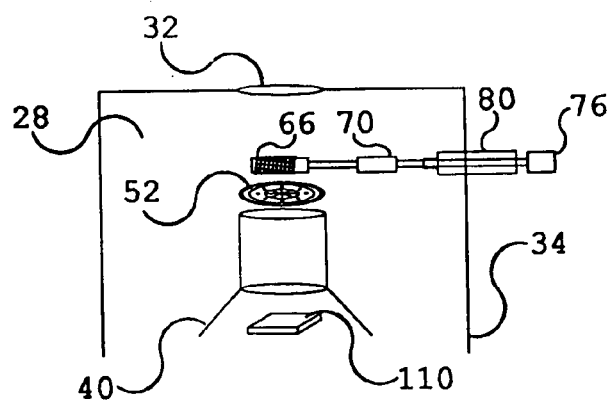

FIG. 5b shows the mechanism of FIG. 5a, assembled and in planar sliced view, as in FIG. 4b of the prior art. This figure shows the relative locations of each of the parts shown in FIG. 5a, as assembled. Here, the photocell 110 and radiation shield 40 would be attached to an LN2 dewar (not shown). The variable diaphragm and driven gear are shown attached to each other in a single combined unit 52. The combined gear and aperture 52 is shown above the radiation shield 40 where it would be attached. The worm gear screw 66 can be seen adjacent to the combined gear and aperture 52, where it can engage the gear and manipulate the aperture. The coupler 70 attaches the worm gear screw 66 to the vacuum feed-through 80 and the rotary dial adjuster 76. The vacuum feed-through 80 is shown penetrating the camera housing 34 into the vacuum 28.

FIGS. 6a, 6b, 6c, 6d, 6e, 6f, and 6g show schematic views of several embodiments of the inventive aperture drive mechanisms, shown without other parts of the infrared camera. For the sake of simplicity, the apertures and gears are shown as single combined units, though it is to be understood that they can be separate or joined units. Furthermore, although there are seven examples described herewith, these examples are not limiting, and serve to teach the inventive apparatus and method. Additional embodiments will become obvious to those skilled in the art.

FIG. 6a shows a schematic view of an exemplary gear driven interchangeable fixed aperture. In this Figure, the worm gear 66 of the type found in FIGS. 5a and 5b drives an interchangeable aperture wheel 48. The aperture wheel 48 in this exemplary view has three fixed apertures of different size. When the worm gear screw 66 drives the interchangeable aperture wheel 48, the various size apertures are sequentially positioned into the optical path, enabling one to select the best size aperture from those available.

FIG. 6b shows in schematic view a gear driven example of the inventive aperture system, as in FIG. 6a, with a gear cog 68 instead of a worm gear 66.

FIG. 6c shows a schematic view of a third embodiment of the system that uses a swappable partial aperture wheel 50 that inserts a small aperture in front of a larger fixed aperture. This system would provide a switch between a larger aperture, the default aperture, not illustrated in the figure, and the smaller size aperture in partial wheel 50 under those conditions that so warranted the smaller size. For example, in a targeting system that uses a wide field of view when scanning for targets and, once a target has been acquired, swaps optics to a zoom lens that inherently possesses a narrow field of view two aperture sizes may be sufficient. Although shown with a worm gear screw 66, the structure would also work with a gear cog of the type shown in FIG. 6b. Further, the invention contemplates a swappable partial aperture wheel comprised of a variety of shapes and configurations, not limited to partial circles. For example, where the "circle" is more roughly rectangular in shape, with a pivot point either at an end or at the middle, the aperture "wheel" can be referred to as an aperture stick. In the cases, such as FIG. 6c, where an aperture is inserted into the optical path, the aperture should be located closely to the fixed aperture beneath it, to minimize changes that would affect radiation shield efficiency.

FIG. 6d shows a schematic view of a piezoelectric motor driven interchangeable aperture. This embodiment is otherwise similar to the aperture of FIG. 6a; however, this exemplary embodiment does not use a gear on, or attached to, the aperture disc. Here, a piezoelectric motor 90 contacts the outer ring 94 of the aperture wheel 48 with its piezo driving element 92. The outer ring 94 of the aperture wheel 48 is replaced with a friction surface with a sufficient coefficient of friction (the current best mode for implementing this embodiment is to use a ceramic ring for the friction surface). That enables the driving element 92 to grip the periphery of the outer ring and push the ring in a rotational direction about the axis of the ring.

FIG. 6e shows a schematic view of a piezoelectric motor driven variable diaphragm. As in FIG. 5a, the variable diaphragm 46 can be attached to the radiation shield through the inner ring 56, and the outer ring 58 can likewise be turned by the piezoelectric motor 90 and piezo element 92 to actuate the variable diaphragm 46. In the cases of piezoelectric motors, the motors can be mounted as shown in FIGS. 6d and 6e, or the motors may be mounted beneath or above the aperture and may actuate the variable diaphragm or swappable fixed aperture from the top or bottom surfaces rather than the outside surface of the aperture.

Figures 6F, 6G:
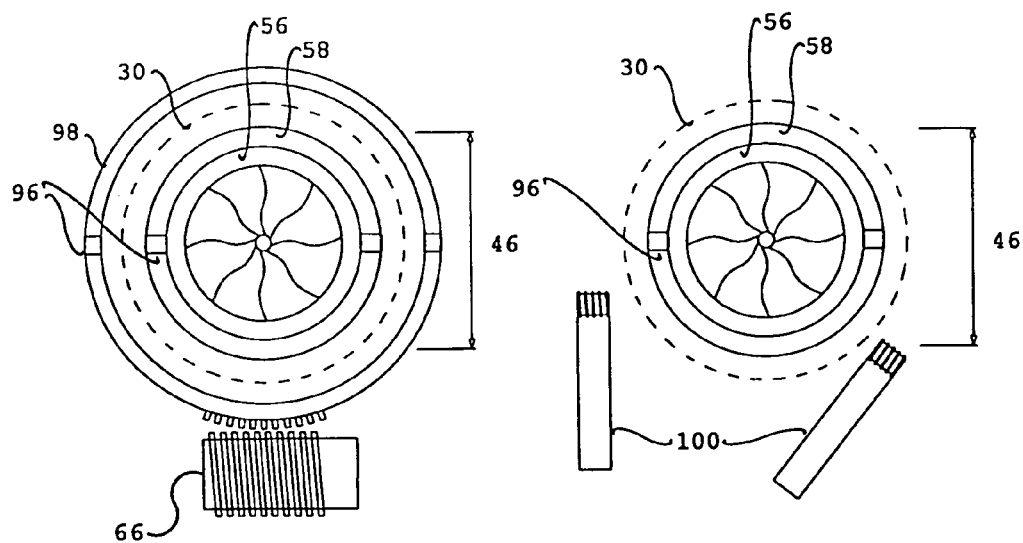

FIGS. 6f and 6g show schematic views of magnetic control means. Magnetic control means offer several distinct advantages, one of which is the absence of any necessity to physically intrude into the vacuum chamber (reducing the possibility of a vacuum leak) and possessing fewer parts likely to outgas after being placed into the vacuum chamber, which destroys the vacuum. The magnetic control means are thus most useful in cases where highly sensitive photocells are used and temperature control is of the utmost concern. FIG. 6f shows a schematic view of magnetic drive system that uses a conventional motor system. The variable diaphragm 46 is as described before, and can be a swappable fixed aperture, as well, though not shown here. The outer ring 58 (or the outer edge of a swappable fixed aperture, not shown) has affixed to it at least one permanent magnet 96, with two shown here. The dashed line represents the vacuum chamber wall 30, outside of which is located the magnetic drive ring 98, with at least one permanent magnet 96 affixed thereto, here two. Any of the drive mechanisms described in this invention, or any other drive mechanism, can be used to drive the magnetic drive ring 98. In this figure, a worm gear 66 is used for that function.

When the worm gear 66 turns magnetic drive ring 98, the magnetic field created by the permanent magnets 96 cause the permanent magnets 96 affixed to the outer ring 58 of the variable diaphragm 46 to turn along therewith. That rotational movement of the outer ring 58 actuates the diaphragm to change the aperture size (in the case of a continuously variable diaphragm) and/or changes the fixed apertures (as in the case of a interchangeable aperture device) as described above.

FIG. 6g, similarly, uses magnetic fields to turn the variable diaphragm or swap the fixed apertures. In this figure, the variable diaphragm 46 has permanent magnets 96 affixed and is located within the dashed vacuum chamber wall 30. One or more electromagnets 100 are located exterior of vacuum chamber 30, positioned directly outside f the non-magnetic vacuum chamber wall 30. As the current applied to the electromagnets 100 increases, the magnetic field generated thereby changes and the permanent magnets 96 are forced to move within the field and actuate the variable diaphragm 46 or swap the fixed apertures (not shown).

Another possible configuration includes the use of a mechanical system such as a belt or chain, either directly driving the variable aperture device or driving a pulley attached to the aperture device. In fact, many similar configurations may suggest themselves to those skilled in the art for inclusion in the present invention.

In any of the interchangeable aperture designs, a detection means should be included for determining when the interchangeable apertures are in position above the underlying fixed aperture or hole in the aperture mounting location. The detection means can include detents that stop the aperture wheel as it rotates under the manipulation of the motor being used to drive the wheel, or contacts on the disc that send a signal to the motor control means as the contacts pass another electrical contact fixed to some non-moving portion of the thermal infrared camera. Furthermore, optical means can be used for positioning, as well as many other possible methods of implementing such detection means, and such methods are also contemplated by the invention.

Figure 7:
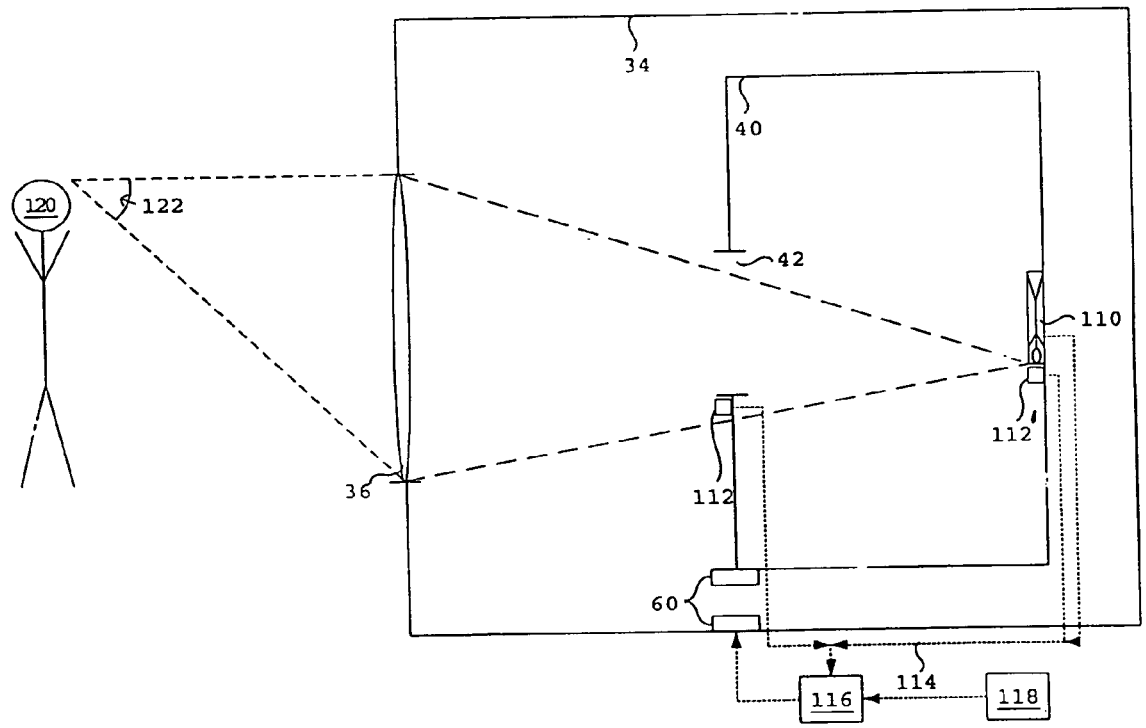
FIG. 7 is a schematic view illustrating sensor locations for logic control systems that control the variable diaphragm.

Reference is next made to FIG. 7, presenting a schematic of an infrared camera system that incorporates several exemplary parts of a logic control system to control the variable aperture. In order to avoid unnecessarily complicating the drawing figure, the aperture control means and variable diaphragm are not illustrated in detail. The aperture control means is simply shown as blocks 60. For completeness, the camera housing 34 is also shown. The cone of radiation 122 entering the camera through the focusing lens 36 arrives at aperture 42 inside the housing and is partially obstructed by the aperture. A first sensor 112 is located inside the housing between the focusing lens 36 and the aperture 42, mounted near an edge of aperture 42. That sensor measures the quantity of radiation arriving at the illustrated location. The sensor 112 is connected by a electrical lead 114 to the logic control module 116 and sends information to the control module, as indicated by the arrowheads. The photocell 110 also provides an output that is also coupled (indirectly, but is shown for simplicity as directly connected) to the logic control module 116. A second additional sensor 112' is shown adjacent to the photocell 110, also connected via electrical lead 114 to the control module 116. Although both the sensors 112 and 112' and the photocell 110 are shown connected to the control module 116, those are each exemplary connections. Either one of these connections is sufficient, as would be other similar connections. The invention contemplates one or more sensors being used in applications requiring the optional logic control system 116. An output of that system is coupled to aperture control means 60

With at least one sensor of 112 and photocell 110 connected, the logic control system 116 can receive information on the quantity of radiation present and can apply a programmed algorithm to determine the appropriate size for the aperture 42. The logic control module 116 then provides a signal to cause the aperture control means 60 to change the size of the aperture 42, as appropriate. If the sensor used is the photocell 110 or any other sensor located within the radiation shield 40, the logic control system 116 can be feedback based, so that as the aperture size changes, the data to the logic control module 116 changes. Generic input means 118 allows the user to directly modify the aperture size manually.

The aperture size can also be changed via control logic that is tied to the selection of the interchangeable lens. When the user switches from search to track mode on the infrared camera and thus swaps another lens with a narrow field of view and different f-number for lens 36, logic control system 116 and variable aperture reacts accordingly and adjusts the f-number of the aperture to properly match the f-number of the replacement lens.

Figure 11:
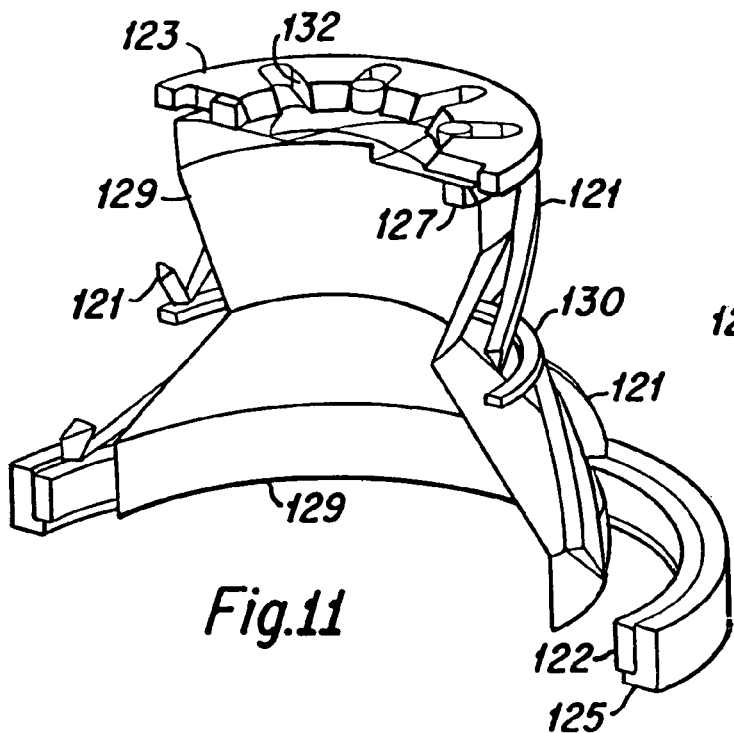
FIG. 11 is a section of and FIG. 12 is an exploded view of the embodiment of FIG. 8.
Figure 12:
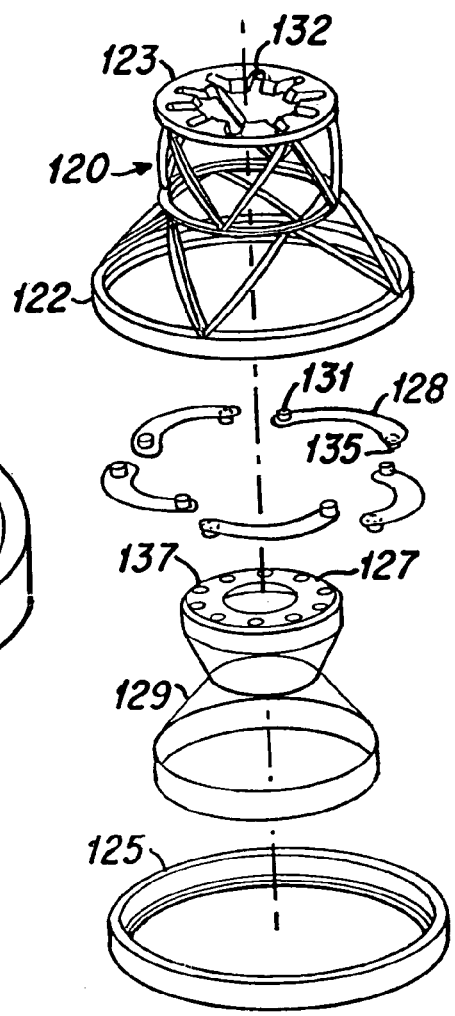
Figure 13:
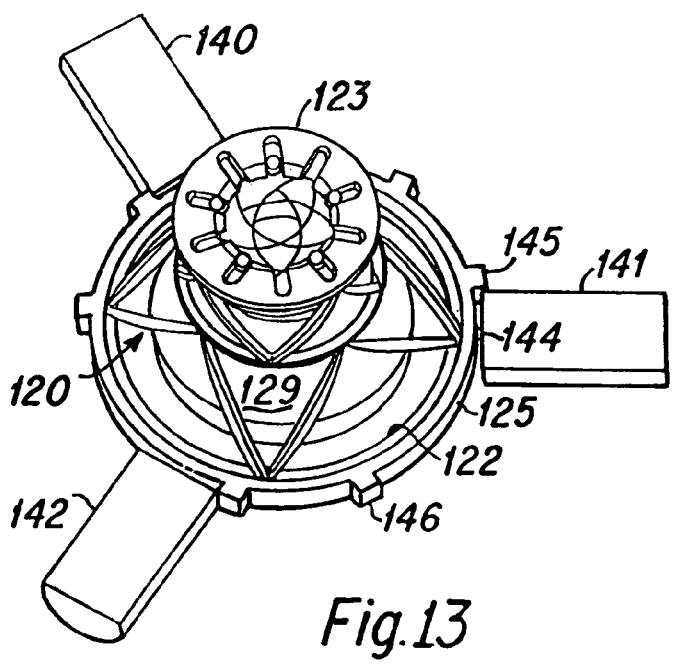
FIG. 13 shows the variable aperture device of FIG. 8 as assembled with three piezoelectric driving motors used to produce motion that changes aperture size.

FIGS. 8 through 13 present a specific embodiment of a variable aperture assembly for an infrared camera constructed in accordance with the invention, such as the infrared cameras of FIG. 6E, FIG. 1 and FIG. 7, earlier described. In the embodiment of FIG. 6E, a piezoelectric motor 90 drives a ring 58 that's concentric with and attached to an inner aperture ring 56 of a variable aperture device of the associated infrared camera, not illustrated. Both those rings essentially lie in the same plane. If due to space limitations, it is not possible to install the driving motor (or motors) and driving ring in the same plane as an aperture ring, then, if a viable camera is to result, the driving ring and motor (or motors) must be moved to a position spaced from the aperture ring. That problem is solved in the preferred embodiment presented in FIGS. 8-13. FIGS. 8, 9, and 10 illustrate the variable (e.g. adjustable) aperture device in top perspective, side and bottom views, respectively. FIG. 11 is a section of and FIG. 12 is an exploded view of the embodiment of FIG. 8. FIG. 13 shows the variable aperture device of FIG. 8 as assembled with three piezoelectric driving motors.

Reference is initially made to FIG. 8. A preferred structure of a variable aperture assembly is presented in this figure in a top perspective view. That assembly includes an open truss or framework 120 and is sometimes referred to herein for reasons that are apparent as an actuator. As the skilled person is aware, a truss is an assemblage of members (as beams) forming a rigid framework; and a framework is a skeletal, open work or structural frame. The truss is formed of stiff thin metal members 121 that extend between and form a unitary integrated structure with cylindrical ring 122 on the bottom end and a flat washer-like shaped ring 123 on the upper end, a driven ceramic ring 125, a radiation shield 129, a second upper ring 127 that forms the upper end of the radiation shield, and a number of blades 128. For reasons that become apparent, rings 123 and 127 may sometimes be referred to herein as aperture rings. Upper ring 127 lies beneath blades 128 and, thus, is not entirely visible in FIG. 8, but is visible in FIGS. 10, 11 and the exploded view of FIG. 12 to which one may make brief reference. Continuing with FIG. 8, in place in an infrared camera, the foregoing assembly is seated in the vacuum region or chamber of the camera housing, behind the entry window, earlier described in connection with FIG. 7 with the radiation shield 129 positioned over the infrared radiation detecting photocell and with the centrally located passage or aperture in the assembly positioned coaxial with the entry window. All of the foregoing rings are coaxial with one another.

As shown in the side view of FIG. 9 to which reference is made, truss 120 in this embodiment is formed by a first group of members 121. Those members define, form, triangles atop circular ring 122, are evenly distributed end-to-end about the periphery of the circular ring (and about radiation shield 129) and are slightly tilted inwardly so that the apex of all the formed triangles lies in a virtual circle. An intermediate ring 130 lies on that circle and is attached to the apex of the underlying formed triangles. In this particular embodiment, the diameter of ring 130 is smaller than the diameter of ring 122, but that relationship can be varied. Another group of truss members, also numbered 121, forms a second group of triangles located on and attached to the upper surface of ring 130. That group of formed triangles is distributed evenly, end-to-end, thereabout the periphery of ring 130 (and about radiation shield 129). The apex of those triangles lies in and defines a second virtual circle. The flat washer-like shaped ring 123 on the top end of the truss framework lies on that second circle and is attached to the apex of the formed triangles. The foregoing truss is an integrated structure. Preferably, the complicated framework is formed from multiple parts that are welded or soldered together manually or is formed by conventional or electrical discharge machining.

Metal members or struts 121 are relatively stiff and are at least strong enough to support ring 123 and allow at least the entire truss assembly and aperture ring to be rotated by turning the bottommost ring 122. The strut assembly is also designed to flex in the axial direction to compensate for thermal expansion and/or contraction of the radiation shield while remaining torsionally stiff. In the assembled position in the infrared camera, the bottom edge of the radiation shield 129 rests on a cooled support member, not illustrated in the figure, and is mechanically fixed in position. That support member is maintained cold, which maintains the photocell, which the radiation shield surrounds, cold, and, indirectly, maintains certain components of the variable aperture device, namely elements 123, 127 and 128, cold. The metal members or struts of the truss are also relatively thin which increases the thermal resistance of the heat conduction path from bottom ring 122, which, as placed in the infrared camera housing, is not cooled, to the upper ring 123, which is cooled.

The material selected for metal members and the rings of the truss is a poor quality heat conductor or, better yet, a thermal insulator. Due to the nature of the structure of the truss, the quantity of metal between the bottom and top ends of the truss is designed to be minimal and thereby minimize heat transfer between those ends. A preferred metal preferred for the foregoing is Titanium. Stainless steel is a less preferred alternative. Some composite materials could be used as an alternative, but would require different manufacturing processes than used for the metal ones. The truss structure serves as a transition or bridge between a warm region and a cold region in the infrared camera without adversely affecting the integrity of the cold region or imposing too great a thermal load on the refrigeration equipment responsible for cooling.

Additionally, because the preferred actuator truss employs a minimum of metal, the structure is lighter in weight than would be the case in which the actuator is constructed with metal walls that are a continuous surface, as in less preferred embodiments of the invention. That adds weight and produces an actuator that is relatively heavy. Since the truss structure hangs on the radiation shield and the infrared camera is subject to shock and vibration in use, a heavy mass for the actuator would be inappropriate.

As a preferred option, a narrow ceramic ring 125 that's slightly larger in diameter than ring 122 fits over and attaches to ring 122, along the outer periphery of the latter. The ceramic, e.g., aluminum oxide, is a poor thermal conductor and adds additional thermal resistance in the path from a relatively warm (e.g., high in temperature) source of heat external to the ceramic ring at the bottom end of actuator 120, such as the motor actuators that drive the rings in rotation, later described, to the refrigerated elements of the adjacent infrared camera structure. The outer periphery of ring 125 has a surface that is hard, does not significantly wear in use, and is low particulating. Ring 123, located at the top of actuator 120, overlies another flat ring that is located at the top of radiation shield 129, but is not visible in this figure and is visible in FIG. 12 to which the interested reader may briefly refer.

Reference is again made to FIG. 8 and to aperture ring 123. The ring contains a number of short slots 132, only one of which is numbered. The slots extend from the inside circular rim of the ring toward the outer periphery of the disk, and are evenly spaced. One end of each slot opens into the central opening in the aperture ring. In this embodiment the slots 132 are straight and are radially directed. In other embodiments the slots may be curved, referred to as tangential by those skilled in variable apertures. Half of those slots capture and function as a guide for respective ones of the cylindrical pins 133 of the underlying blades 128 that underlie the central passage in ring 123 and collectively defining the central aperture for the camera or lens. The blades are captured between ring 123 and the underlying ring 127 on the upper end of radiation shield 129. Those elements are better illustrated in the exploded view of FIG. 12 to which reference is again made.

The thin blades 128 underlie ring 123 and are sandwiched in partially overlapping relationship between ring 127 and ring 123. Blades 128 form the aperture for the infrared energy, much like the variable diaphragm aperture device or iris in a conventional 35 mm light camera. Five blades are shown, each of which is flat and narrow and curved in a shallow convex arc. Although space exists in the structure for ten blades, a preferred number, the complication of illustrating that number of blades would likely detract from the description. Hence, only five blades are illustrated in the figure.

Each blade 128 contains a pair of small cylindrical pivot pins 131 and 135, one located at each end. The first pivot pin 133 of the two is directed in one direction, upward. The second pivot pin 135 of the pair is located at an opposite end of the blade and is directed in the opposite direction, downward. Aperture ring 127 carried on the radiation shield contains a series of ten cylindrical holes 137, each of which is designed to function as a socket to receive a respective one of the downwardly directed pivot pins 135 of a blade. Holes 137 are slightly larger in diameter than the associated pivot pin 135 to permit the pin to rotate in the hole with no friction or only minimal frictional resistance.

The pivot pin 135 of each blade in the series is inserted in a respective hole 137 in consecutive order, whereby the blades partially overlap. That assembly orients the upwardly directed pivot pins 131 of the blades to be evenly spaced on top of ring 127, spaced a distance sufficient to align with one of the slots 132 in aperture ring 123 of actuator 120. Aperture ring 123 (and the actuator 120) is lowered over the blades and the radiation shield 129, and the slots in ring 123 are carefully slipped over the extending upper pins 131. As those skilled in the art appreciate, the result of the rings and blade relationship is a variable aperture device. That is, by holding the radiation shield 129 and hence, ring 127, fixed and rotating ring 123 in one direction about its axis one end of blades 128 is pivoted outwardly to increase the diameter of the central aperture formed by the blades. By rotating ring 123 in the opposite direction instead, the blade ends are pivoted radially inwardly, closing down that formed aperture. As seen in the top view of FIG. 8, the overlapping blades 128 define a central aperture coaxial with the principal axis of the aperture rings and the entire assembly. However, by shaping the blades properly the aperture can be made square, rectangular and various other shapes to better match the bundle of the rays of radiation passing from the lens through the aperture to the photocell. When the ring 123 is turned to open the aperture, the pivot pins 133 of the blades move radially outwardly in the associated slots, while the pivot pins 135 on the underside of the blade pivot in their respective socket 137.

For completeness, reference is made to the top perspective view of the variable actuator assembly in FIG. 13. As earlier described in this specification, a variety of known means are available for adjusting aperture size, manually mechanically, magnetically or electrically, which in this embodiment amounts to rotating the aperture ring 122 (or the attached ceramic ring 125) in one direction or the other, turning the actuator 120 and ring 123 that moves aperture defining blades 128. One way was to use a piezoelectric motor to drive the lower ring (or the ceramic ring, if used). Such kind of driver is ideally suited for driving the variable aperture assembly of FIGS. 8-11. In FIG. 13, three piezoelectric motors 140, 141 and 142 are evenly spaced about the periphery of ceramic ring 125, placed in operative engagement with the ceramic ring, and fastened in place to the support structure, not illustrated, of the infrared camera to fix the relationship.

Piezoelectric motors (also known as piezo motors) can be operated in a variety of configurations. For the implementations discussed here, the described piezo motors are being operated as linear actuators. Linear piezo actuators or motors operate by producing very small motions at very high frequencies to achieve linear motion. Motion is achieved in a direction normal to the pre-load force of the motors. Piezoelectric materials produce a small change in length when subjected to a voltaic potential. Several commercial implementations of piezo linear motors are currently available. In general, linear piezo motors produce motion by coupling a high frequency varying normal force with oscillating motion perpendicular to the normal force at the same frequency. A phase shift between the varying normal force and side motion produces a slip-grab-slip effect and generates force and the ensuing motion. Piezo motors can also be configured to produce rotary motion using similar mechanisms.

Linear piezo motors require a pre-load force normal to the desired direction of motion for operation. The pre-load or normal force is typically greater than the linear tangential force generated by the motor. It is therefore advantageous to use multiple motors spaced symmetrically in a ring such that the applied normal forces have a net sum of zero on the rotating stage. Doing so reduces the drag associated with radial loading of variable aperture mechanisms and the removes design complexities that would be required to support large radial forces.

Each such piezoelectric motor contains a pin 144 that projects from the front end of the motor, a driving pin, visible in the figure only in motor 141. That driving pin is spring-loaded and presses against ceramic ring 125, placing the motors in operative engagement with the ring and firmly holding the ceramic ring (and attached actuator) in angular position, when the motors are deenergized.

Ceramic ring 125 in this figure includes various stops, such as stops 145 and 146, which are optional and were not included in the other figures. Those stops may be included as an option to allow a pair of predetermined aperture positions to be selected. When the ring attains a maximum amount of travel, the stop abuts the motor, as example, which blocks further rotation. An additional advantage of using the mechanical stops is that the stress on the pins of blades 128 of the variable aperture is minimized.

Another preferred option, the surfaces of the variable aperture that face the photocell, such as one side of ring 127 and the remaining inside surfaces of radiation shield 129 and blades 128 are coated in a black color or other radiation absorbing material. The blades are also lubricated with Teflon® brand polytetrafluoroethylenes, a lubricant, or equivalent lubricant, which does not outgas in vacuum.

Construction of the blades in the variable aperture device is self-evident to those skilled in the art, as example by stamping or pressing using a die. The rings used in the present embodiment of the device are formed integral with the respective actuator and radiation shield, forming an integrated assembly and the blades are installed and used in that construction. As one appreciates the foregoing assembly easily fits in the interior of an infrared camera, is an integrated structure that is small in size and light in weight, and, with few parts, should be reliable and relatively maintenance free. As example the embodiment of FIGS. 8-13 may be installed within an infrared camera of the type illustrated in FIGS. 3 and 7. More importantly, the assembly is small enough to fit inside hermetically sealed type of infrared cameras that use Stirling engine for cooling and are commonly used in military applications, and in handheld commercial infrared camera that do not use LN2 for cooling.

In the foregoing embodiment of FIG. 8, the driving ring 122 is located in a position that is vertically spaced from aperture ring 123 (see FIG. 9) and also from the circular ring 127 at the upper end of radiation shield 129 (see FIG. 11). As those skilled persons recognize in other practical embodiments, the truss 121 could be of a relatively planar geometry rather than the three dimensional shape of FIG. 9. In that case driving ring 122 and aperture ring 123 would still be coaxial and effectively thermally isolated from one another, but would be spaced apart by the difference in the diameter between the two rings. Although the details of a camera structure permitting such a variation can't presently be visualized, the possibility nonetheless remains. As one also appreciates, a great advantage of the foregoing embodiment is the ability to permit some elements of the infrared camera (and the rings of the embodiment) to be cryogenically cooled, while other elements are not (or cannot be cooled), which is desired in the most sensitive infrared thermal imaging cameras. However, that is not a limitation on the application of the variable aperture device. The invention is functional and sound even in less sensitive infrared cameras that do not require refrigeration. Be that as it may, though functional, as a practical matter, the device may be more costly than one would wish for the kinds of imaging accomplished with those less expensive and less sensitive cameras.

In the embodiment of FIG. 8, the actuator is a metal truss structure. The open spaces in the sides of the truss minimizes the weight of the actuator and the slender members provide a constricted thermal path between the ends of the actuator that minimizes the conduction of heat between the lower and upper ends. The lightness of the actuator is due principally because the structure has large openings between the metal members of the truss framework, and there are no solid or continuous walls. As those skilled in the art realize, it is possible for other embodiments to provide an actuator that contains solid or continuous walls, forming the hour glass-like or horn-like geometry and use that alternative actuator in the variable aperture device of the preceding figures. That can be accomplished without obtaining the benefits of the design of FIG. 8, yet fall within the scope of the present invention. As example, an actuator with solid walls constructed of metal, such as titanium. As a practical matter that alternative is not desirable or practicable.

The better alternative of is to provide an actuator with solid walls that secures the advantages of the truss. Specifically, such an alternative configuration of the actuator may be formed of a composite material, such as fiberglass. The composite material is not a metal, but a non-metal, is light in weight and, typically, possesses low thermal conductivity and a low temperature coefficient of expansion, to minimize any change of shape with temperature change while the formed shape is sufficiently rigid to be self-supporting and carry an aperture ring, Collectively those properties appear to provide an equivalent positive effect. Although not shown in the drawing, one may readily visualize the actuator 120 of FIGS. 8-13 as having solid walls instead of the truss and avoid the necessity for an additional drawing.

Having demonstrated the feasibility and structure of an infrared camera with an adjustable aperture, which can be automatically or manually adjusted by the user, then new problems arise. As example, with the foregoing the only mechanism for predetermining aperture position is via mechanical stops. Accordingly, as an additional feature applicant has added position monitoring of the aperture size and invented the loop circuit structure that provides that information, which is presented next. Position sensing of variable aperture positions may be achieved via a multiplicity of contact and non-contact methods. Non-contact methods are illustrated.

Figure 14:
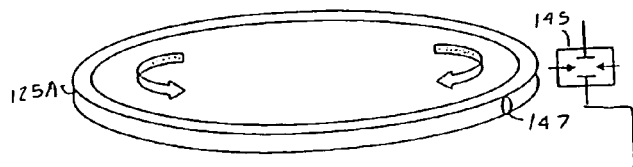
FIGS. 14, 15 and 16 respectively pictorially illustrate a variety of position sensors that may be used in the variable aperture combination of FIG. 8 to permit remote monitoring and indication of aperture size, including a Hall-effect sensor, a reflective optical switch and a slotted optical switch.

FIG. 14 shows the incorporation of a proximity sensor. This figure illustrates a hall effect sensor 145 which returns proximity and position information due to a change in flux associated with a ferrous portion of a sensing ring 147 that is attached to the driving ring 125A of the actuator. Driving ring 125A corresponds to the ceramic ring 125 used in the embodiment of FIG. 8, which has been modified as described in the preceding sentence. By design the degree of angular rotation of ring 125A from a base position is correlated to the size of the aperture formed and that is the algorithm installed in converter 149. The angle information output from hall sensor 145 is coupled to a converter 149 which converts the sensor reading to aperture size information and places that information in the appropriate form of digital signals for driving a digital LCD display, such as display 151. The converter 149 and LCD display may be miniaturized and carried by the infrared camera. For ease of understanding the power supply and associated power circuits for the foregoing are omitted, but should be well known to those skilled in the art.

Figure 15:
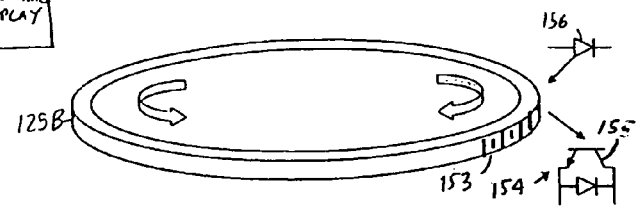

FIG. 15 is an alternative rotation sensor that may be used in place of the one illustrated in FIG. 14. This rotation sensor also modifies the ceramic ring 125 that's attached to the driving ring 122 of actuator 120 of FIG. 8 to provide a sensing ring 125B, containing alternating absorbing and reflecting stripes 153 located on the edge of the ring. A reflective optical switch 154 that consists of a photodiode 155 (collecting light) and a light emitting diode 156 (LED) that supplies the light. These are often referred to as photoreflectors. By design the degree of angular rotation of ring 125B from a base position is correlated to the size of the aperture formed and that is the algorithm installed in a converter, not illustrated. The converter converts the sensor reading to aperture size information and places that information in the appropriate form of digital signals for driving a digital LCD display, not illustrated. As in the prior figure, the converter and LCD display may be miniaturized and carried by the infrared camera.

An alternative method using the same hardware would simply sense the end or beginning of an absorbing or reflective stripe. Another method would be to use multiple photoreflectors and several stripes, each corresponding to a discrete or set of discrete aperture settings.

Figure 16:
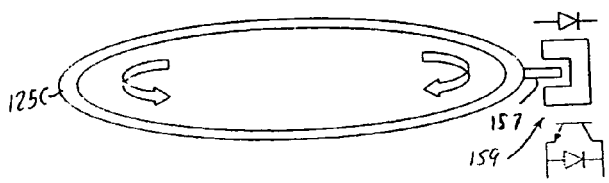

FIG. 16 shows an angular position sensor that uses a slotted optical switch. This embodiment also modifies the ceramic driving ring to provide a sensing ring 125C that contains a tab or set of tabs 157, representing angular position, connected to the sensing ring and another implementation of a photodiode/LED combination 159. During rotation of the actuator and sensor ring 125C the tabs pass between the emitter and light source thereby interrupting the light path. As in the prior embodiments, a correlation exists between a particular tab and the angular position. An appropriate converter and LCD digital display, not illustrated, obtain the output of combination 159 and convert that to digital information of aperture size. Slotted optical switches of the foregoing type are readily available as are photoreflectors and hall sensors.

Some lenses, like those found in reflective telescopes contain an exit pupil or aperture stop that's located in the front of the lens, and do not contain an exit pupil behind the lens inside a vacuum enclosure. Placing an aperture inside the vacuum enclosure in such a case does not serve as an effective aperture stop, and would either cause vignetting or pass undesired radiation to the photocell. As those skilled in the art appreciate from an understanding of the present invention, there are a great many reflective telescopes that are in use today, whose replacement would be cost prohibitive, and yet such telescopes would greatly benefit from the inclusion of an adjustable aperture, such as presented in this application. While the solution is not immediately apparent, the present inventors addressed and resolved those needs. An additional object of the present invention, thus, is to retro-fit existing infrared cameras that contain a fixed cold stop aperture for use with a lens that is not matched to the f-number of that cold stop and also to retro-fit an reflective telescope that does not contain an aperture stop in the space behind the infrared camera mounting.

A like situation exists for infrared cameras that are constructed with a hermetically sealed dewar or vacuum enclosure, containing a fixed aperture, that are to be used with a reflective telescope that is not f-number matched to the infrared camera. As one appreciates the foregoing optical system employed lenses of shaped glass or crystalline material. Some of those lenses may optionally be telescopic. Basically, those systems are referred to as refractive optical systems. But there's also another class of telescopic lenses, more specifically mirrored optics that collect and direct light rays from distant objects to an eyepiece or sensor. As example, the combination a large concave dish-shaped mirror containing a central aperture and a small convex shaped mirror located in front of the concave dish coaxial with the aperture in the latter. Light from distant objects are collected by the large mirror and focused on the small convex mirror. The light incident on the small convex mirror is reflected through the aperture whereby the image propagates to an infra red camera. Those reflective mirror systems are referred to as reflective optical systems.

In accordance with an aspect of the invention the retro-fit device adds an external variable aperture in front of the camera, between the camera body and the telescope. The external variable aperture is placed in a vacuum enclosure and is cooled in a similar fashion to the aperture, described earlier herein, located inside the camera vacuum enclosure. This external variable aperture is then coupled with a relay optical assembly that images the variable aperture onto the camera's fixed aperture. In that way the front telescope is thereby f-number matched to the camera.

Figure 17:
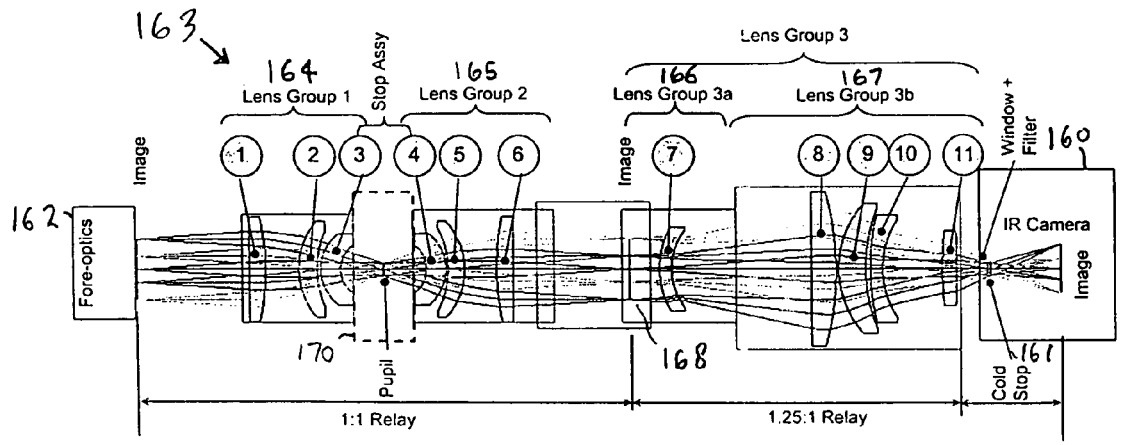
FIG. 17 illustrates a fixed aperture camera that is retrofitted to include an external variable aperture device.

FIG. 17 shows an arrangement for matching an infrared camera 160 that contains a built in fixed aperture 161, located to the right side, to a reflective or refractive lens system 162 shown in block form to the left, that is of an f-number that is not matched to the camera f-number. That "mismatch" occurs if a new lens is provided for the camera to accomplish some unrelated imaging problem, as example, using the camera in a situation that the original camera and lens were not intended to be used. For this retro-fit a lens assembly 163 is incorporated between lens 162 and camera 160.

That lens assembly that re-images the image that is formed by the front lens via a variable aperture 170. The lens assembly contains a variable aperture 170, which is controlled in size by any of the means earlier described. That external variable aperture is cryogenically cooled by means independent of the camera and exist in a dedicated vacuum enclosure 171 to minimize heat transfer by convection. A first lens group 164, located to the left of the variable aperture contains three lenses that relay the image from lens 162 to form a stop at the external variable aperture. A second lens group 165 to the right side of the variable aperture also contains three lenses. The second lens group reforms the image from the first lens group and recreates that image at the object location 168 of two additional groups of lenses 166 and 167.

Effectively, lens groups 164 and 165 define a 1:1 image relay that recreates the image. Lens groups 166 and 167 form a demagnifying relay (in this case) that relays the image formed by the 1:1 relay onto the camera photocell array, via the fixed aperture 161 in the camera. The best practical embodiment of the lens assembly for a specific infrared camera and a specific reflective telescope is described in table 1 in this specification.

In situations where an infrared camera is already built with a fixed aperture, and a need arises to use that camera with a reflective telescope (that does not have an exit pupil, or aperture stop at the position of the fixed aperture, or with a lens that is not f-number matched with the camera an approach exist for building an external variable cold stop to the camera. The external variable cold stop and the actuation mechanism can be any of those that were earlier herein described. The variable aperture is placed inside a vacuum enclosure for reason discussed elsewhere in this specification.

This external-to-the-camera variable aperture cold stop serves to match the f-number of the telescope or lens, while relaying the images through a set of lenses properly designed to achieve several objectives: (1) the image of the telescope or lens is relayed through intermediate image planes to the photocell on the camera, (2) the external aperture stop is reimaged onto the camera's fixed aperture stop. In doing so, in effect the camera is being matched to the f-number of the lens.

The location of the external aperture behind the telescope is determined by the optics between the telescope and the cold stop that form an image of the telescope's aperture stop at the position of the variable aperture. This system solves the problem of using a single camera that has a built in fixed aperture with many telescopes or different lenses that are f-number unmatched to the camera.

The infrared camera diaphragm apparatus should have wide industrial applicability, not only to military, police, search and rescue applications, but also to other applications in which infrared signals may be present in a wide variety of quantities, such as in agriculture. The invention has further applicability in any circumstance where the dynamic range of the given electronics is insufficient, where various f-numbers are needed, or where additional user tunability is desired.

It is believed that the foregoing description of the preferred embodiments of the invention are sufficient in detail to enable one skilled in the art to make and use the invention without undue experimentation. However, it is expressly understood that the details of the embodiment presented for the foregoing purpose is not intended to limit the scope of the invention in any way, in as much as equivalents to those elements and other modifications thereof, all of which come within the scope of the invention, will become apparent to those skilled in the art upon reading this specification. Thus, the invention is to be broadly construed within the full scope of the appended claims.

TABLE 1

System optical details (example of one embodiment for matching an infrared camera with an f number of f/4 to a two-mirror telescope of f/10)
Effective Focal Length: −33.77514
F/3.99

| Surf | Radius (mm) | Thickness (mm) | Glass | Diameter (mm) | conic Con | Comments |
|---|---|---|---|---|---|---|
| OBJ | Infinity | 0 | | 25.5 | 0 | Object plane |
| 1 | Infinity | 44.0 | | 25.5 | 0 | |
| 2 | −2001.1 | 6.5 | ZNSE | 42 | 0 | Lens 1 |
| 3 | −106.0 | 13.0 | | 42 | 0 | |
| 4 | 32.1 | 7.2 | ZNSE | 38 | 0 | Lens 1 |
| 5 | 40.6 | 1.5 | | 29.0 | 0 | |
| 6 | 19.9 | 7.6 | CAF2 | 30 | 0 | Lens 3 |
| 7 | 12.7 | 16.5 | | 19.6 | 0 | |
| STO | Infinity | 17.1 | | 8.3 | 0 | External Variable Cold Stop |
| 9 | −12.7 | 7.6 | CAF2 | 19.6 | 0 | Lens 4 |
| 10 | −19.9 | 0.8 | | 30 | 0 | |
| 11 | −39.2 | 6.5 | ZNSE | 38 | 0 | Lens 5 |
| 12 | −31.0 | 12.5 | | 30 | 0 | |
| 13 | 111.3 | 6.5 | ZNSE | 42 | 0 | Lens 6 |
| 14 | Infinity | 45.7 | | 42 | 0 | |
| 15 | Infinity | 12.1 | | 25.5 | 0 | Intermediary Image plane |
| 16 | 36.5 | 4.8 | ZNSE | 34 | 0 | Lens 7 |
| 17 | 27.9 | 54.5 | | 29.4 | 0 | |
| 18 | Infinity | 10.1 | SILICON | 64 | 0 | Lens 8 |
| 19 | −123.5 | 1.1 | | 64 | 0 | |
| 20 | 42.8 | 10.5 | SILICON | 54.3 | 0 | Lens 9 |
| 21 | 72.0 | 1.81 | | 46.7 | 0 | |
| 22 | 103.4 | 4.9 | GERMANIUM | 50 | 0 | Lens 10 |
| 23 | 37.9 | 23.5 | | 37.2 | 0 | |
| 24 | 162.4 | 5.8 | SILICON | 28 | 0 | Lens 11 |
| 25 | −396.2 | 12.4 | | 28 | 0 | |
| 26 | Infinity | 1.0 | GERMANIUM | 10.0 | 0 | Window |
| 27 | Infinity | 0.4 | | 9.8 | 0 | |
| 28 | Infinity | 0.5 | SILICON | 9.3 | 0 | Filter |
| 29 | Infinity | 0 | | 9.2 | 0 | |
| 30 | Infinity | 26.9 | | 9.2 | 0 | Internal Fixed Cold Stop |
| IMA | Infinity | | | 20.4 | 0 | Image |

What is claimed is:

1. A variable aperture assembly for an infrared camera comprising:

a radiation shield;

a rigid structural framework, said rigid structural framework having an upper end and a lower end, a central axis and large open areas in the sides;

said radiation shield being positioned inside said rigid structural framework coaxial to the central axis framework thereof and including a central infrared radiation admitting passage, an input end and an output end for propagating infrared radiation admitted within said radiation shield from said input end out through said output end;

said input end facing said upper end of said rigid structural framework and including a first aperture ring;

said first aperture ring including a central circular opening positioned coaxial with said central axis for passing infrared radiation and a circumferential portion surrounding said central circular opening;

said upper end of said rigid structural framework including a second aperture ring;

said second aperture ring including a central circular opening positioned coaxial with said central axis for passing infrared radiation and a circumferential portion surrounding said central circular opening, and having an end that opens into said central circular opening;

said lower end of said rigid structural framework including a driving ring, said driving ring including a central circular opening positioned coaxial with said central axis, said driving ring having a peripherally extending rim for supporting said rigid structural framework;

one of said circumferential portion of said first aperture ring and said circumferential portion of said second aperture ring including a plurality of pivot holes and the other one of said circumferential portion of said first aperture ring and said circumferential portion of said first aperture ring and said circumferential portion of said second aperture ring including a plurality of slots, said slots having an open end that opens into said central circular opening;

each of said pivot holes and said slots being evenly distributed about said central axis;

a plurality of aperture blades arranged to define an aperture for passage of infrared radiation, said defined aperture being coaxial with said central circular openings in said first and second aperture rings;

each of said aperture blades including a front blade surface, a rear blade surface, a first pivot pin attached to, located proximate one end of said blade and projecting from and normal to one of said front and rear blade surfaces, and a second pivot pin attached to, located proximate an opposite end of said blade and projecting from and normal to the other one of said front and rear surface blades, and comprising a flat curved geometry;

said first pivot pin of respective ones of said plurality of aperture blades being received within respective ones of said pivot holes; and said second pivot pin of respective ones of said plurality of aperture blades being received with respective ones of said slots, whereby rotation of said second aperture ring in one direction relative to said first aperture ring increases size of said defined aperture in said blades and rotation in an opposite direction decreases the size of said defined aperture;

wherein rotation of said driving ring while maintaining said second end of said rigid structure framework fixed in position rotates said rigid structural framework and thereby rotates said second aperture ring relative to said first aperture ring to change the size of said defined aperture.

2. The variable aperture assembly as defined in claim 1, wherein said rigid structural framework further comprises a bridge between a warm region and a cold region in the infra-red camera.

3. The variable aperture assembly as defined in claim 2, wherein said bridge comprises a metal.

4. The variable aperture assembly as defined in claim 3, wherein said metal comprises titanium.

5. The variable aperture assembly as defined in claim 2, wherein said bridge comprises a non-metallic composite.

6. The variable aperture assembly as defined in claim 1, wherein said one of said circumferential portion of said first aperture ring and said circumferential portion of said second aperture ring comprises:
    said circumferential portion of said first aperture ring; and
    wherein said other one of said circumferential portion of said first aperture ring and said circumferential portion of said second aperture ring comprises:
    said circumferential portion of said second aperture ring.

7. The variable aperture assembly as defined in claim 1, wherein said first blade surface of each of said plurality of blades oriented facing said second aperture ring.

8. The variable aperture assembly as defined in claim 1, further comprising: electric motor means for rotating said driving ring.

9. The variable aperture assembly as defined in claim 8, wherein said electric motor means comprises a plurality of electric motors.

10. The variable aperture assembly as defined in claim 8, wherein said electric motor means comprises a plurality of piezoelectric actuators, said plurality of piezoelectric actuators being equally spaced about the periphery of said driving ring and adapted to be energized simultaneously to produce a rotational force on said driving ring without producing a net radial force thereon transverse said central axis of said driving ring.

11. The variable aperture assembly as defined in claim 10, further comprising a ceramic ring, said ceramic ring being attached to the exterior of said driving ring for rotational movement concurrent therewith and said ceramic ring including a peripheral ring.

12. The variable aperture as defined in claim 1, wherein said driving ring is axially spaced from each of said first and second aperture rings.

13. The variable aperture as defined in claim 1, wherein said slots comprise radially directed straight slots.

14. An infrared imaging camera comprising:
    a housing;
    an optical lens for coupling infra-red images of objects incident on said lens from the exterior to the interior of said housing; said optical lens including a central axis and having an f-number;
    a vacuum chamber located inside said housing, said vacuum chamber being maintained in-vacuum and including a vacuum window located at a front end of said vacuum chamber for admitting infra-red images that enter said housing through said optical lens to the interior of said vacuum chamber, said vacuum window being positioned coaxial of said central axis and in spaced relation to said optical lens;
    an imaging type infra-red photocell having a plurality of radiation sensitive pixels for converting incident infra-red images to electrical signals, said infra-red photocell being located inside said vacuum chamber, spaced from said vacuum window, positioned coaxial of said central axis and in heat insulated relationship with the walls of said vacuum chamber;
    an integrated variable aperture and radiation shield assembly located in said vacuum chamber via said vacuum window to said imaging type infra-red photocell and defining an aperture of said f-number of said optical lens, said variable aperture device including a front side facing said optical lens and a rear side facing said infra-red photocell and further comprising:
    a radiation shield;
    a rigid structural framework, said rigid structural framework having an upper end and a lower end, a central axis and large open areas in the sides and comprising a bridge between a warm region and a cold region in the infrared imaging camera;
    said radiation shield being positioned inside said rigid structural framework coaxial to the central axis framework thereof and including a central infrared radiation admitting passage, an input end and an output end for propagating infrared light energy admitted through said input end out through said output end thereof;
    said input end facing said upper end of said rigid structural framework and including a first aperture ring;
    said first aperture ring including a central circular opening positioned coaxial with said central axis for passing infrared radiation and a circumferential portion surrounding said central circular opening;
    said upper end of said rigid structural framework including a second aperture ring;
    said second aperture ring including a central circular opening positioned coaxial with said central axis for passing infrared radiation and a circumferential portion surrounding said central circular opening;
    said lower end of said rigid structural framework including a driving ring, said driving ring including a central circular opening positioned coaxial with said central axis, said driving ring having a peripherally extending rim for supporting said rigid structural framework;
    one of said circumferential portion of said first aperture ring and said circumferential portion of said second aperture ring including a plurality of pivot holes and the other one of said circumferential portion of said first aperture ring and said circumferential portion of said first aperture ring and said circumferential portion of said second aperture ring including a plurality of slots, said slots having an open end that opens into said central circular opening;
    each of said pivot holes and said slots being evenly distributed about said central axis;
    a plurality of aperture blades arranged to define an aperture for passage of infrared radiation, said defined aperture being coaxial with said central circular openings in said first and second aperture rings;
    each of said aperture blades including a front blade surface, a rear blade surface, a first pivot pin attached to, located proximate one end of said blade and projecting from and normal to one of said front and rear blade surfaces, and a second pivot pin attached to, located proximate an opposite end of said blade and projecting from and normal to the other one of said front and rear surface blades, and comprising a flat curved geometry;

said first pivot pin of respective ones of said plurality of aperture blades being received within respective ones of said pivot holes; and said second pivot pin of respective ones of said plurality of aperture blades being received with respective ones of said slots, whereby rotation of said second aperture ring in one direction relative to said first aperture ring increases size of said defined aperture in said blades and rotation in an opposite direction decreases the size of said defined aperture;

wherein rotation of said driving ring while maintaining said second end of said rigid structure framework fixed in position rotates said rigid structural framework and thereby rotates said second aperture ring relative to said first aperture ring to change the size of said defined aperture;

said sides of said variable aperture device including a radiation absorbing coating for preventing reflection of light to said infrared photocell;

said radiation shield surrounding said infra-red photocell being in thermal conductive relationship with said first aperture ring and comprising a heat transmissive material;

said radiation shield including an inside surface facing said central axis that contains a parasitic radiation absorbent coating to prevent parasitic radiation being reflected to said photocell; and mechanical adjusting means coupled to said variable aperture device for adjusting said aperture to match said f-number of said aperture to said f-number exhibited by said optical lens to minimize entry of extraneous rays of light, and, should the infrared radiation received when said camera f-number is so matched to said optical f-stop be too intense for said photocell, for increasing said camera f-number to reduce radiation received by said photocell; and cryogenic cooling means for cooling said infra-red photocell, said radiation shield, and said variable aperture device to a cryogenic temperature to maintain said infra-red photocell, said variable aperture device and said radiation shield, at a significantly lower temperature than said housing and said walls of said vacuum chamber.

15. The infrared camera as in claim 14, wherein said optical lens further including an adjustable focal length to permit a user to selectively change the local length of said optical lens between at least a short focal length to permit a wide field of view of exterior scenes and defining a first optical f-number and a long focal length to permit a close-up or narrow field of view of said scene and defining a second optical f-number.

16. The infrared camera as in claim 14, wherein said variable aperture device is controlled by a logic control means, said logic control means receiving the f-number of said optical lens and causing said mechanical adjusting means to adjust said defined aperture of said variable aperture device to maintain a desired f-number.

17. The infra-red imaging camera as deified in claim 14, wherein said variable aperture device comprises: a variable iris, said variable iris including a plurality of blades, each of said plurality of blades including a coating of a non-outgassing greaseless solid lubricant material.

18. The infra-red imaging camera as defined in claim 14, wherein said mechanical adjusting means comprises:
a first portion external of said vacuum chamber;
a second portion internal to said vacuum chamber;
and a third portion mechanically coupling said first and second portions;
said third portion comprising a minimally heat-conductive material to prevent heat from the exterior of said vacuum chamber from entering said vacuum chamber.

19. The infra-red imaging camera as defined in claim 14, wherein said mechanical adjusting means comprises at least one piezoelectric actuator.

20. The infrared imaging camera as defined in claim 14, wherein said one of said circumferential portion of said first aperture ring and said circumferential portion of said second aperture ring comprises:
said circumferential portion of said first aperture ring; and
wherein said other one of said circumferential portion of said first aperture ring and said circumferential portion of said second aperture ring comprises:
said circumferential portion of said second aperture ring.

21. An infra-red imaging camera comprising:
a housing;
an optical lens for coupling infra-red images of objects incident on said lens from the exterior to the interior of said housing;
a vacuum chamber located inside said housing, said vacuum chamber including a vacuum window located at a front end of said vacuum chamber for admitting infra-red images that enter said housing through said optical lens to the interior of said vacuum chamber, said vacuum window being positioned in spaced relation to said optical lens;
an infra-red photocell for converting incident infra-red images to electrical signals, said infra-red photocell being located inside said vacuum chamber, spaced from said vacuum window, and in heat insulated relationship with the walls of said vacuum chamber;
a variable aperture assembly located in said vacuum chamber for permitting passage of infra-red images admitted into said vacuum chamber via said vacuum window to said infra-red photocell, said variable aperture assembly including a front side facing said optical lens and a rear side facing said infra-red photocell comprising:
a radiation shield;
a rigid structural framework, said rigid structural framework having an upper end and a lower end, a central axis and being essentially open and comprising a bridge between a warm region and a cold region in the infrared imaging camera;
said radiation shield being positioned inside said rigid structural framework coaxial to the central axis thereof having a central infra-red radiation admitting passage, an input end and an output end for propagating light energy admitted through said input end through said output end thereof;
said input end including a first aperture ring;
said first aperture ring including a central circular opening for passing infra-red radiation;
said upper end of said rigid structural framework including a second aperture ring, said second aperture ring including a central circular opening for passing infra-red radiation; and
said lower end of said rigid structural framework including a driving ring;
one of said circumferential portion of said first aperture ring and said circumferential portion of said second aperture ring including a plurality of pivot holes and the other one of said circumferential portion of said first aperture ring and said circumferential portion of said second aperture ring including a plurality of radially directed slots, said radially directed slots having an open end that opens into said central circular opening;

each of said pivot holes and said slots being evenly distributed about said central axis;

a plurality of aperture blades arranged to define an aperture for passage of infra-red radiation, said defined aperture being coaxial with said central circular openings in said first and second aperture rings;

each of said aperture blades comprising a flat curved geometry and having a front blade surface, a rear blade surface, a first pivot pin attached to, located proximate one end of said blade and projecting from and normal to one of said front and rear blade surfaces, and a second pin attached to, located proximate an opposite end of said blade and projecting from and normal to the other one of said front and rear blade surfaces;

said first pivot pin of respective ones of said plurality of aperture blades being received within respective ones of said pivot holes; and said second pivot pin of respective ones of said plurality of aperture blades being received within respective ones of said slots, whereby rotation of said second aperture ring in one direction relative to said first aperture ring increases the size of said defined aperture in said blades and rotation in an opposite direction decreases the size of said defined aperture;

wherein rotation of said driving ring axially while maintaining said second end of said rigid structure framework fixed in position rotates said rigid structural framework and thereby rotates said second aperture ring relative to said first aperture ring to change the size of said defined aperture and thereby vary the f-number of said defined aperture;

a radiation shield surrounding said in infra-red photocell, said radiation shield being in thermal conductive relationship with said first aperture ring and comprising a heat transmissive material;

cooling means for cooling said infra-red photocell said radiation shield, and said variable aperture device to a low temperature to maintain said infra-red photocell, said variable aperture device and said radiation shield, at a significantly lower temperature than said housing and said walls of said vacuum chamber 22. The infra-red imaging camera as defined in claim 21, wherein said radiation shield includes an inside surface that includes a radiation absorbent coating to prevent parasitic radiation from being reflected to said infrared photocell; and wherein said cooling means comprises cryogenic cooling means for cooling said infrared photocell, said radiation shield, and said variable aperture device to a cryogenic temperature; and further comprising:

mechanical adjusting means coupled to said variable aperture device for adjusting the aperture to match said camera f-number to the optical f-number exhibited by said optical lens to minimize entry of extraneous rays of light.

23. An infrared imaging camera, said camera including a lens possessing an f-number and an adjustable aperture device defining an f-number for said camera that is dependent on the size of the aperture defined by said aperture device, and means for detecting the f-number of said aperture produced by said adjustable aperture device, comprising:

an indicator ring, said indicator ring for rotating in angular position in response to a change in adjustment of said adjustable aperture device to change the size of said aperture, said degree of rotation being related to the size of said aperture;

position detecting means for determining the angular position of said indicator ring; and converter means coupled to said position detecting means for correlating the angular position of said indicator ring determined by said position detecting means to a corresponding f-number.

24. The infrared camera as defined in claim 23, further comprising:

control loop means responsive to said f-number from said converter means for attaining a desired change in adjustment of said adjustable aperture device.

25. The infrared imaging camera as defined in claim 23 wherein said position detection means comprising a non-contacting position detecting means for determining the angular position of said ring without making physical contact with said indicator ring.

26. The infrared imaging camera as defined in claim 25 wherein non-contacting position detecting means comprises a member selected from the group consisting of: a hall effect sensor, a magnetic flux sensor, a slotted optical switch and a photoreflector.

* * * * *